US006289457B1

(12) United States Patent
Bishop et al.

(10) Patent No.: US 6,289,457 B1
(45) Date of Patent: Sep. 11, 2001

(54) VALUE DATA SYSTEM HAVING CONTAINERS FOR THEFT DETERRENT REPOSITORIES

(75) Inventors: Richard Leslie Bishop, San Francisco, CA (US); Jay Raymond Slusher, Phoenix, AZ (US)

(73) Assignee: Amdahl Corporation, Sunnyvale, CA (US)

(*) Notice: Subject to any disclaimer, the term of this patent is extended or adjusted under 35 U.S.C. 154(b) by 0 days.

(21) Appl. No.: 09/143,938

(22) Filed: Aug. 31, 1998

Related U.S. Application Data

(63) Continuation-in-part of application No. 09/118,493, filed on Jul. 17, 1998.
(51) Int. Cl.[7] .................................................. G06F 12/14
(52) U.S. Cl. .................................................................. 713/200
(58) Field of Search ................................... 713/152, 200, 713/153, 201, 156, 171; 705/50, 51, 53, 69, 70, 75, 76, 79; 380/226, 228, 229, 232, 233, 278

(56) References Cited

U.S. PATENT DOCUMENTS

| 5,461,217 | * | 10/1995 | Claus ................................. 235/380 |
| 5,931,947 | * | 8/1999 | Burns et al. .......................... 713/201 |

FOREIGN PATENT DOCUMENTS

WO200013083A* 3/2000 (WO) .................................. 713/201

OTHER PUBLICATIONS

Telephony, Decoding the secret password is an easy key to computer fraud, G. Calhoun, Apr. 4, 1983.*

\* cited by examiner

*Primary Examiner*—James P. Trammell
*Assistant Examiner*—Pierre Eddy Elisca
(74) *Attorney, Agent, or Firm*—David E. Lovejoy

(57) ABSTRACT

A value data system for secure electronic storage, transfer and other processing of value data using repositories of security controlled devices. The value data system includes a repository container including one or more of the repositories and a container security unit providing security signals as a function of conditions detected in the repository container. The repositories transfer data from or to the security controlled devices in response to a client request from a client system. Each repository in the value data system includes a security enclosure containing the security controlled devices. Each security controlled device includes a deactivation unit for electronically deactivating the security controlled device. The repository includes a repository processor unit connecting a value data transfer request from the client system to the security controlled devices and for transferring value data from the security controlled devices. The repository includes a repository security unit for sensing a security breach and for responsively initiating a deactivating sequence for deactivating the security controlled devices to inhibit transfers of data from the security controlled devices. A multi-tier operation controls security in the value data system.

97 Claims, 10 Drawing Sheets

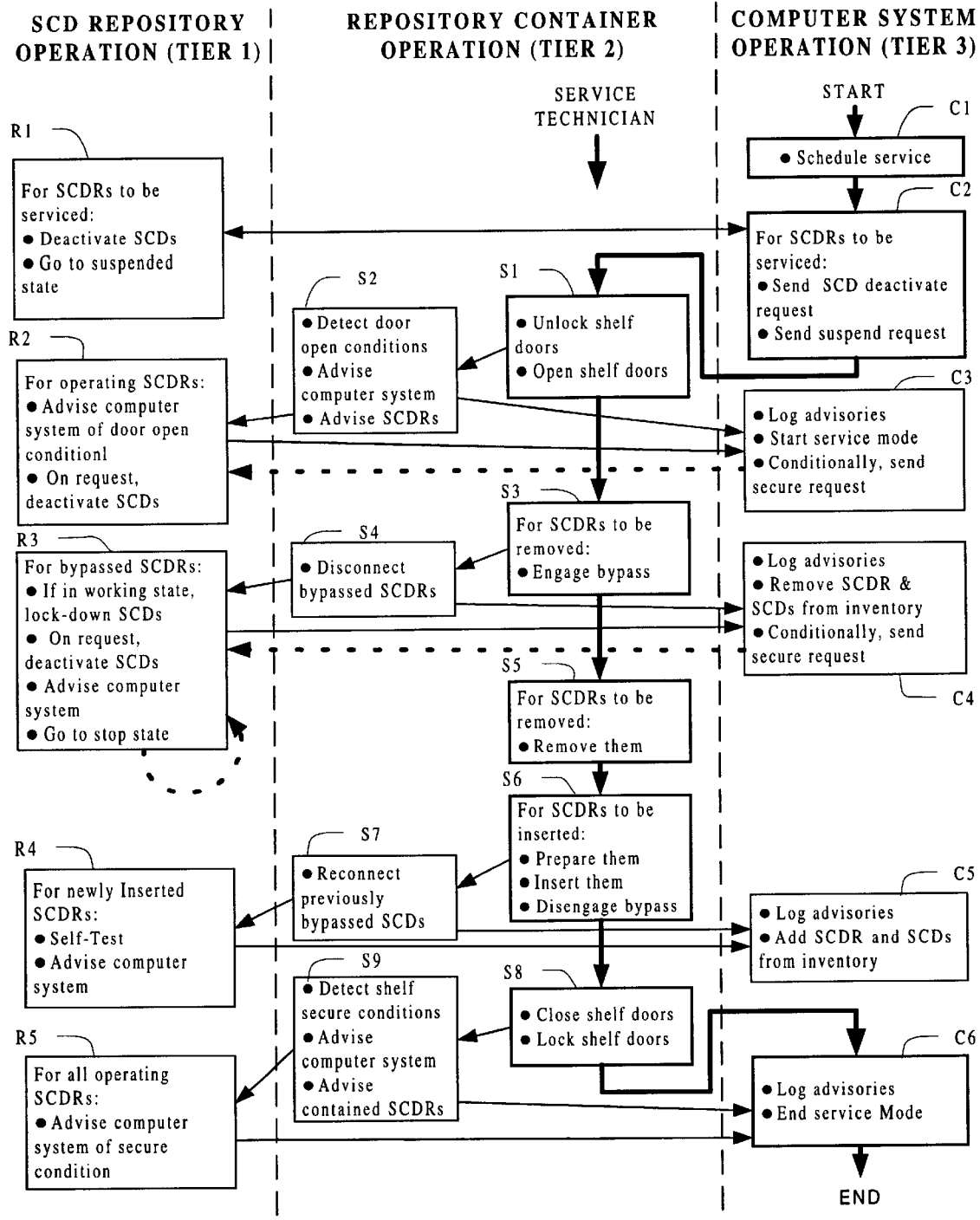

VALUE DATA SYSTEM HAVING CONTAINERS FOR THEFT DETERRENT REPOSITORIES

CROSS-REFERENCE

This application is a continuation-in-part of U.S. patent application Ser. Code/Ser. No. 09/118,493 filed Jul. 17, 1998 entitled THEFT DETERRENT REPOSITORY FOR SECURITY CONTROLLED DEVICES, and invented by Richard Leslie Bishop and Jay Raymond Slusher.

BACKGROUND OF THE INVENTION

The present invention relates to the field of security in data processing and electronic commerce and particularly to methods and apparatus for secure storage and transfer of electronic funds and other value data.

Data processing systems have been used to store and transfer electronic funds, encryption codes and other value data. To deter theft of the value data, data processing systems have employed devices having some form of security control (security controlled devices). An example of such data processing systems are electronic funds systems where the security controlled devices are smart cards. Another example of such data processing systems are cryptographic systems where the security controlled devices are stores for encryption codes and algorithms for encrypting data. While cryptographic techniques have been used to protect communications to and from security controlled devices, cryptology alone does not protect against the theft of the security controlled devices themselves. Electronic funds, encryption codes and other value data can be stolen from a data processing system by stealing the security controlled devices themselves thereby stealing the value data contained therein or associated therewith.

In the field of electronic commerce, wire transfers are one electronic method for the transfer of value that involves the transfer of funds from one trusted party to another. In a wire transfer, one party makes a debit book entry and the other party makes a credit book entry as a result of value data electronically sent from one party to another in accord with preestablished procedures agreed to by the parties. The wire transfers are usually subject to clearing operations to verify that the debit and credit entries have been made correctly and to reconcile the accounts between the parties. The security of the wire transfer of funds is higher if the value data transfer that implements the wire transfer is encrypted using electronic encryption/decryption devices, codes or algorithms. Such electronic encryption/decryption devices or the devices that store the codes or algorithms need to be security controlled devices since, if these devices are stolen, the security of the wire transfers is compromised.

In the field of electronic commerce, electronic cash is another electronic method for the transfer of value that involves the transfer of funds from one party to another. Electronic cash methods include two types of transfers, namely certificated value and net value transfers.

For the certificated value type of electronic cash, an issuer generates electronic value or transaction records, generally cryptographically encoded and signed, that represent distinct amounts of value. These electronic value or transaction records may be passed from one electronic cash device to another electronic cash device. For example, the transfer of funds occurs from a small portable electronic cash device (smart card) held by one party to an electronic cash device held by another party. In one form common to consumers, smart cards are portable cards similar in form and size to common credit or debit cards. In an alternate miniature form, the size is reduced to contain small contact area and internal electronics only. Typically, a smart card is issued by the issuer and dispensed to a first party (for example, a purchaser) where the card is pre-loaded or subsequently loaded with stored electronic value or transaction records (certificates), the electronic value record (certificate) is passed by the first party to an electronic cash device of another party (for example, a merchant) and, eventually, the electronic value record (certificate) is returned to the issuer by the other party for redemption in the amount of the electronic value record (certificate). Usually, electronic cash devices used by merchants, banks and other financial institutions are under the administrative and technical control of an issuer. Electronic cash devices that contain electronic value records need to be security controlled devices since, if these devices are stolen, the amount of money represented by the electronic value record (certificate) can be permanently lost.

For the net value type of electronic cash, the electronic value is represented by the net amount stored in an electronic device without need for further external accounting. Specifically, in the net value type of electronic cash, the value is not represented by electronic certificates or transaction records that must be transferred and redeemed from an issuer. The net value type of electronic devices are called value stores and each is capable of storing a net amount of value that reflects the accumulated aggregate of value transfers from and to that value store from other value stores.

Value stores can be implemented using cards (smart cards) that are similar to those used for the certificated value type of electronic cash except that the rules controlling the transfer of value are appropriate for the net value type of electronic cash. In an electronic funds system, merchants, banks or other institutions are the issuers that issue value stores (in the form of smart cards) to customers. The issuer in turn retains value stores capable of performing transactions with the value stores of its customers and others. An issuer may require tens or hundreds of value stores to conduct transactions with the value stores in the possession of its customers or correspondent institutions. Electronic value stores need to be security controlled devices since, if these devices are stolen, the amount of money represented by the electronic net value stored can be permanently lost.

Physical security is a typical method of protecting security controlled devices. In electronic funds environments, the individual security controlled devices are small devices that are easily concealed and moved. If the security controlled devices are value stores in a bank or other institution, the value stores are frequently contained in locked and guarded vaults with stringent access controls to the vaults. However, such physical security alone is increasingly difficult and insufficient as security controlled devices are further miniaturized and as security controlled devices are distributed to remote locations and institutions without vaults.

Because of the limitations and high costs of physical security, various methods have been provided to electronically enable and disable security controlled devices so that in the disabled state, they offer a reduced value to potential thieves. Previous systems have reduced the incentive for theft by manually removing value data from security controlled devices or by using secure operating modes for transfers involving security controlled devices.

The secure operating modes for security controlled devices are frequently manually implemented and frequently employ a data key such as a Personal Identification Number (PIN). In one commonly used implementation, a value store may be locked to inhibit the normal action of removing electronic funds so that restoration of the ability to remove electronic funds from the value store that is disabled or locked requires use of a previously determined PIN to unlock the value store. The PIN number may or may not be changeable depending on the design of the value store. Procedures are required for creation and distribution of PIN numbers, and of course the consequences of performing incorrect security procedures renders the value store not accessible by the ordinary means.

In another PIN implementation, a PIN number is required for the lock operation as well as for the unlock operation. The lock and unlock PIN numbers may be the same or different and they each may be fixed or changeable. In this variation, transaction durations are increased in order to accommodate the lock and unlock operations and sustainable transaction rates to value stores are reduced because of the PIN operations that must be performed. Difficulties resulting from the distribution of and procedures for use of PIN numbers remain present in such implementations.

In a high-security variation, a PIN number unique to the lock operation must be supplied with the lock operation and again to reverse the lock operation. In this variation, transaction duration is increased and sustainable transaction rate to a value store is reduced because of the additional restrictions on the PIN operations. This variation is sometimes called a single-use key method. Difficulties from distribution of and procedures for use of PIN numbers are more complicated.

In another high-security variation, the value store requires the presentation of the PIN number before every occurrence of some or all operations, but the relocking is automatic after each operation. In this variation, compared to the previous high-security variation, the transaction duration is slightly decreased and the sustainable transaction rate to a value store is slightly increased because a manual lock operation is not required after each operation.

Methods of unlocking value stores are varied. A first (primary) method of unlocking value stores employs an unlocking sequence in which a first unlocking key (primary unlocking key) is used to unlock locked value stores. The unlocking key must be available from some source. A second method of unlocking value stores, used in addition to the first method, operates independently of any requirement for knowledge of the primary unlocking key.

This second method, sometimes called a backdoor method, may be used, for example, by a security manager to unlock a value store when the primary key to unlock that value store has been lost, intentionally erased, or never supplied. A backdoor method may be required to unlock a value store where an security mechanism internal to the value store automatically locks the value store in response to an external security threat. An example of such a security threat exists where repeated unsuccessful attempts to unlock a locked value store occurs and the repeated unsuccessful attempts are detected by the value store itself. While backdoor methods of unlocking provide flexibility, strong operational security is required to protect against fraudulent use of a backdoor method.

The aforementioned security procedures have the following general disadvantages:

Methods which disable operation of security controlled devices generally are effective only for security controlled devices that are not in use since value stores that are locked cannot be used to dispense electronic funds.

While conventional PIN methods can improve security for an individual value store, they do not protect other values stores that may be similarly situated and may soon come under attack.

In order to be effective, rigorous training and discipline of staff is required. If the distribution of PIN numbers is not well controlled, PIN numbers will be unavailable when needed.

The knowledge of the methods for enabling and disabling the security controlled devices must be widespread among authorized agents. For example, if a large staff like that in the institutional environment of a bank requires access to security controlled devices, then the keys (PIN numbers) and the knowledge of how to enable and disable value stores must be imparted to or available to that large staff. The process of generating, storing and distributing the keys makes the system susceptible to invasion for theft and hence reduces security.

The security processing can be time consuming. For example, the process of locking or unlocking a value store may require multiple manual operations.

Procedures become progressively more onerous as the number of security controlled devices in a system increases.

Handling small devices that are easily concealed and may have considerable value is a temptation for casual theft.

The use of manual key (PIN) operations causes a transaction duration to increase undesirably and causes the sustainable transaction rate to a security controlled device (value store) to be reduced undesirably. These increases and decreases result because, prior to value data transfer, an unlock operation must be performed, and subsequent to the value data transfer, a lock operation must be performed. The prior and subsequent operations consume communications time and processing time including the time required to generate commands and perform the operations for validating and otherwise processing keys (PIN's).

While the forgoing disadvantages and limitations exist when the agents are individuals interacting with one or a small number of value stores, the problems are magnified in a setting where there are many agents sharing access to many value stores, particularly when the value stores are unattended.

Practical systems tend to group value stores in larger enclosures such as shelves and racks for shelves. These larger enclosures add to the complexity of processing and increase the security risk at least because of the greater numbers of value stores that are concentrated in a common location.

In light of the problems of prior art systems, there is a need for improved methods and apparatus for secure electronic storage, transfer and other processing of value data using security controlled devices and particularly for secure repositories which remove incentives for theft.

SUMMARY OF THE INVENTION

The present invention is value data system for secure electronic storage, transfer and other processing of value data using repositories of security controlled devices. The value data system includes a repository container including one or more of the repositories and a container security unit providing security signals as a function of conditions detected in the repository container. The repositories transfer data from or to the security controlled devices in response to a client request from a client system.

Each repository in the value data system includes a security enclosure containing the security controlled devices. Each security controlled device includes a deactivation unit for electronically deactivating the security controlled device. The repository includes a repository processor unit connecting a value data transfer request from the client system to the security controlled devices and for transferring value data from the security controlled devices. The repository includes a repository security unit for sensing a security breach and for responsively initiating a deactivating sequence for deactivating the security controlled devices to inhibit transfers of data from the security controlled devices.

The present invention has a multi-tier operation which controls security in the value data system. In tier 1, the security controlled device repositories operate in a manner which can lock or otherwise deactivate the repository in the event that security is breached and this operation is carried out internally without any requirement for external security signals from tier 2 or tier 3. In addition to the tier 1 operations, tier 2 adds additional security to the tier 1 security and allows security-compromising conditions in the repository container to pass security signals to the tier 1 level devices so that the tier 1 devices can be appropriately deactivated in response to the tier 2 signals. The tier 3 security operation is under control of computers in the client system. The client system operates to issue the commands associated with the transfer value data to and from the repositories and the commands which are necessary to control some security operations in tier 2 and tier 1. Such operations include deactivation under conditions detected in tier 3 as well as planned operations such as maintenance or other service of the value data system.

In one embodiment of the repository container, SCD repositories can be installed and de-installed by insertion into or removal from an enclosure. The repository container can be any physical enclosure for securing SCD repositories and generally the container includes a door, cover or other restrainer for restraining the SCD repositories. The repository container includes detectors which include, for example, control logic which functions in response to loss of power, communication loss, sensing of combinations of door open and door lock engagement or disengagement, or other security-compromising events to provide detection signals to the container control unit so that security signals can be responsively generated.

The present invention includes various embodiments wherein:

The locking sequence obtains locking keys from the processor unit and applies the locking keys to lock the security controlled devices.

The locking sequence includes discarding the locking keys after the security controlled device is locked so that the locking key does not remain in the security enclosure.

The locking sequence includes obtaining locking keys from the client system and applying the locking keys to lock the security controlled devices The processor unit randomly generates the locking key and discards the locking key after the security controlled device is locked so that the locking key does not remain in the security enclosure.

The security controlled device includes means for sensing a security breach and for responsively automatically locking the secured controlled device.

The security controlled devices include unlocking means for unlocking the security controlled devices to permit transfers of data from the security controlled devices.

The unlocking means responds to an unlocking sequence for unlocking the security controlled devices.

The unlocking sequence includes a primary unlocking sequence and a backdoor unlocking sequence.

The locking sequence obtains locking keys from the processor unit, applies the locking keys to lock the security controlled devices and discards the locking keys after the security controlled devices are locked so that the locking keys do not remain in the security enclosure and wherein each of the security controlled devices includes unlocking means responsive to a backdoor sequence for unlocking the security controlled devices to permit transfers of data from the security controlled devices.

The forgoing and other objects, features and advantages of the invention will be apparent from the following detailed description in conjunction with the drawings.

BRIEF DESCRIPTION OF THE DRAWINGS

FIG. 23 depicts a block diagram representation of atypical operation of the value data system of FIG. 1.

DETAILED DESCRIPTION

Figure 1:
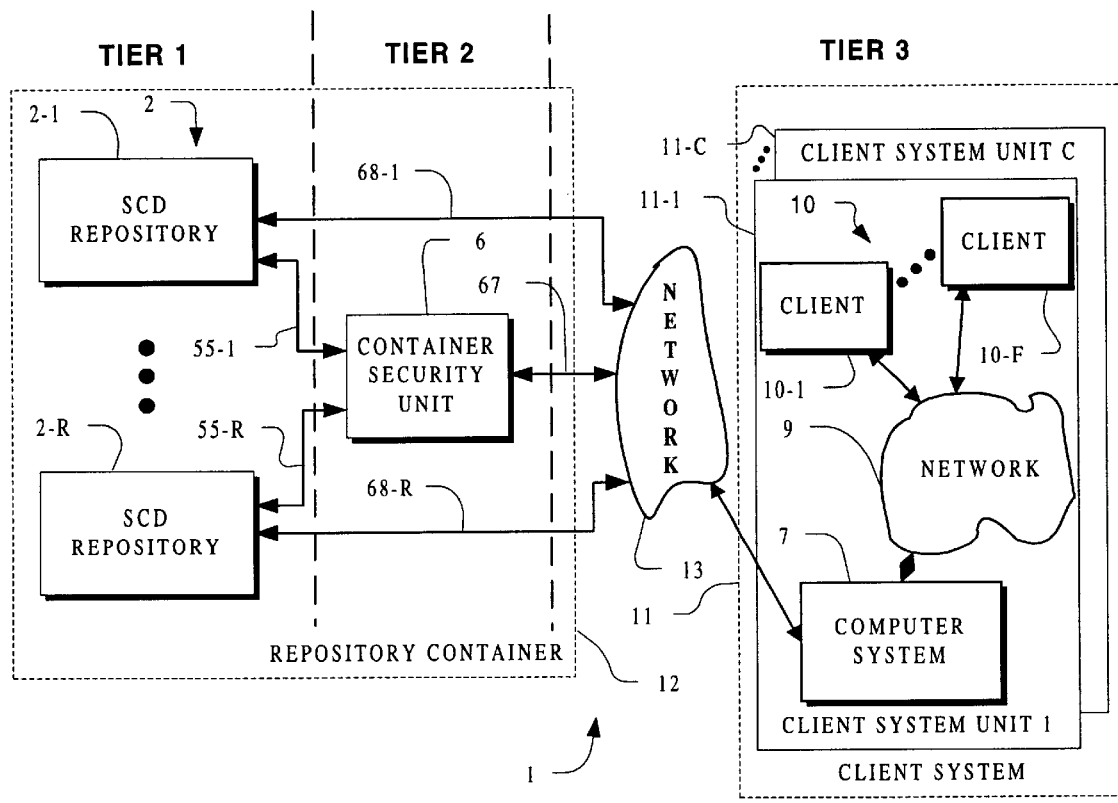
FIG. 1 depicts a block diagram representation of a value data system including a repository container connected through a network to a client system.

Value Data System—FIG. 1

In FIG. 1, a value data system 1 is shown in which a repository container 12 is connected by a network 13 to a client system 11. The repository container 12 contains security control device (SCD) repositories 2, including the SCD repositories 2-1, . . . , 2-R. The SCD repositories 2 connect through a container security unit 6 and a network 13 to the client system 11. Also, SCD repositories 2 connect directly through the network 13 to the client system 11. Network 13 is any public or private network or other connection such as a local area network, dedicated direct connection, telephone network or the Internet. Client system 11 typically includes a personal computer (PC) or computer server and is used for electronic commerce, encryption or other operations relating to transfers of value data.

The client system 11 is formed of one or more client system units 11-1, . . . , 11-C. The client system unit 11-1 is typical and includes a computer 7, a network 9, and clients 10 including the clients 10-1, . . . , 10-F. Network 9 is any public or private network or other connection such as a local area network, dedicated direct connection, telephone network or the Internet. The clients 10 are correspondent entities for receiving or sending funds or other value data from or to the SCD repositories 2. The SCD repositories 2-1, . . . , 2-R connect via lines 55-1, . . . , 55-R to the container security unit 6.

In FIG. 1, the computer system 7 typically is a computing system of a bank, retailer, or other entity needing simultaneous or secure access to security controlled devices 3 contained in security controlled device repositories 2. The clients 10 typically are merchants or individuals dealing in electronics funds transfer with the owner or operator of the computer system 7. If an SCD repository 2 contains funds for a financial institution like a bank, the clients 10 likely are customers of the bank or other financial institutions. If the repository 2 contains funds of an individual or a merchant, the clients 10 typically are other individuals or merchants, or financial institutions associated with the individuals or merchants associated with the repository 2. The computer system 7 may be capable of receiving advisory messages from the repository 2. Although operation of the repository 2 does not depend on correct receipt of advisories by the computer system 7, the computer system 7 may use advisory messages to control operations of the value data system 1. SCD repositories 2 receive security signals from the container security unit 67.

In a typical embodiment of the value data system 1, the SCD repositories 2 contain value data. The SCD repositories 2 store value data and transfer the value data between the client system 11 and the SCD repositories 2. The value data system 1 has a multi-tier security operation. The SCD repositories 2 operate in the first tier and have a self-locking attribute such that whenever conditions indicate that security is compromised, the stored value data is locked. The container security unit 6 operates in a second security tier to provide security signals to the SCD repositories under conditions when security may be compromised in the repository container and under normal operating conditions. The client systems 11 and each of the client systems units 11-1, . . . , 11-C operate in the third security tier to present commands to both the container security unit 6 in tier 2 and the SCD repositories 2 in tier 1.

In the present invention, the security operation functions to maintain the security of value data. The term "value data" means data that is given special properties and requires special rules for access in a data processing system. By way of example, electronic funds are "value data" and have the special properties of being the equivalent of cash so that the special rules of access are similar to those used for the secure handling of cash. By way of another example, security codes are "value data" and have the special properties of being able to control access to other data so that the special rules of access need to be highly secure. In general, the term "value data" means any data that warrants the security operations and access controls of the present invention.

In the present invention, value data is accessed in security controlled devices. Security controlled devices are devices that can be deactivated so that access to the value data that otherwise might be accessed from the devices is prevented. The term "deactivation" means the locking of security controlled devices so as to prevent vale data access, the removing of value data from security controlled devices so that the value data is no longer in the devices and means any other manner of preventing access to value data in security controlled devices. The term "reactivation" means the reversal of a previous deactivation.

Figure 2:
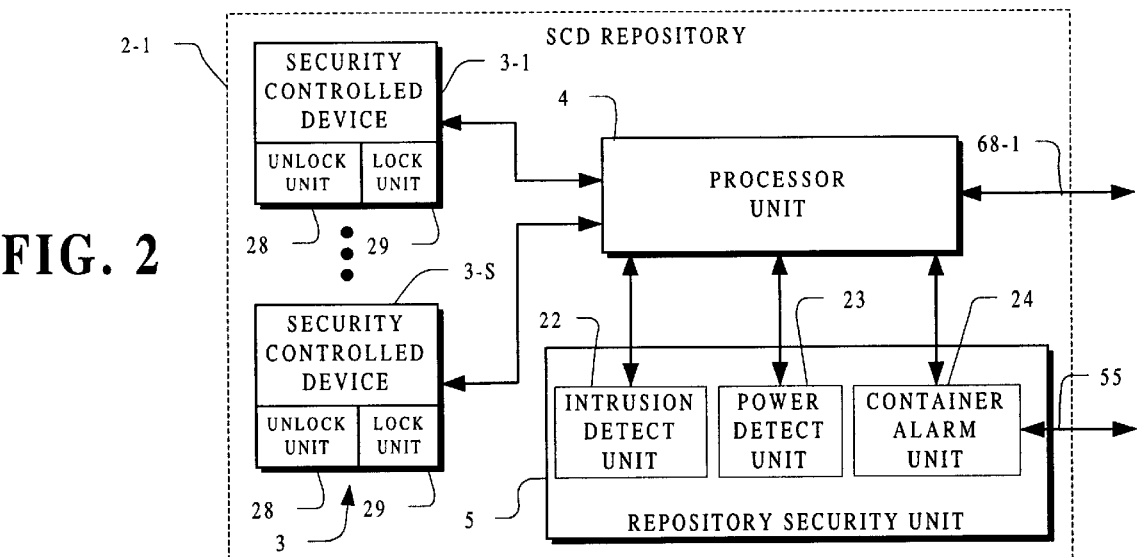
FIG. 2 depicts a block diagram representation of a security controlled device repository within the repository container of FIG. 1.

Security Controlled Devices (SCD) Repository—
FIG. 2

In FIG. 2, an SCD repository 2-1 typical of the repositories 2 of FIG. 1 contains one or more security controlled devices 3, a processor unit 4 and an SCD security unit 5. The security controlled devices 3, including devices 3-1, . . . , 3-S, are available for storing, transferring or otherwise processing value data.

In FIG. 2, the security controlled devices 3 typically can be locked by the lock unit 29 to inhibit all or some kinds of value data transfer to or from the security controlled devices 3. Typically, a key such as a PIN is required to unlock a security controlled device 3 by operation of the unlock unit 29 to permit value data transfers. Security controlled devices 3 that contain no value data or that are locked so that value data cannot be accessed have low incentive for theft.

In FIG. 2, the processor unit 4 typically contains one or more micro-processors that operate to process normal transactions related to value data transfers and to process exceptional conditions related to the security of the system. Exceptional conditions include physical intrusion into the repository 2, power failure, communication loss, system not-good and other conditions. The processor unit 4 typically includes batteries, capacitors or similar power storage devices that insure a supply of power and other necessities that allows processor unit 4 to remain operable, after disconnection from an external power source, for a sufficient time to perform security and shutdown procedures. The processor unit 4 may include fixed or loadable programs executed by programmed microprocessors, or may be implemented in other electronic components. The actions taken by the processor unit 4 in response to external signals may depend on previous signal inputs and other conditions that change the internal state of the processor unit 4.

In a typical embodiment of the FIG. 2 SCD repository 2, the security controlled devices 3 are smart cards for reading and transferring of electronic funds. The terms electronic funds and electronic cash include money, frequent flyer miles or any other measure of value. The security controlled devices 3 as value stores may store multiple millions of dollars (or other currency or other valuable tokens) in electronic form and hence need to be secure. The security controlled devices 3 as value stores, because of their small size, are even greater potential targets for theft or fraud than are more bulky cash deposits.

In FIG. 2, the security unit 5 includes control logic which functions in response to loss of power, communication loss, intrusion or other security-compromising events to provide security_compromised or other signals to alert the processor unit 4 that a possible insecure condition exists. In response to a security_compromised signal, in response to internal security algorithms executed in processor unit 4 or in response to external security requests from client system 11 or the container security unit 6 of FIG. 1, processor unit 4 deactivates the security controlled devices 3. Such operation insures a low incentive for theft of the security controlled devices 3.

In FIG. 2, the security unit 5 includes an intrusion detect unit 22, a power detect unit 23 and a container alarm unit 24. The tamper detect unit 22 functions to detect tampering with the repository 2 or of its contents including the security controlled devices 3, the processing unit 4 and the security unit 5.

The intrusion detect unit 22, for example, senses physical intrusion into the repository 2 and senses attempts to remove components from the system, especially attempts to remove security controlled devices 3. Upon detection of intrusion, intrusion detect unit 22 provides security_compromised security signals to the processor unit 4.

The power detect unit 23 functions to detect any loss or abnormal reduction of power to the repository 2 or to any of its contents including the security controlled devices 3, the processing unit 4 or the security unit 5. The power detect unit 23 includes, for example sensors which detect and signal normal operating power conditions and control logic which functions in response to loss of power or disconnection from an external power source to sense a power_fail_imminent condition. Upon detection of any power_fail_imminent condition, power detect unit 22 provides a security_compromised security signal to the processor unit 4.

The container alarm unit 24 functions to detect any security signals 55 from the container security unit 6 of FIG. 1. Upon detection of any security signal from the container security unit 6, the detect unit 22 provides a security_compromised condition or other security signal to the processor unit 4. The security signals may be coded in the security state of the repository container 12.

In response to a security signals from the SCD security unit and internal security algorithms executed in processor unit 4 (which may depend on the internal state of the repositories 2) or in response to external security requests from client system 11, processor unit 4 can deactivate all or any ones of the security controlled devices 3 to inhibit value data transfers and hence to provide a low incentive for theft of the security controlled devices 3.

Normal Operation

Typically, an electronic commerce system contains multiple repositories 2 for value data transfers and a variable number of repositories 2 may be in use at any time. Repositories 2 in normal operation, in response to requests from the client system 11, move value data into and out of the security controlled devices 3. The movement of electronic funds is usually with the client 10 making a deposit to a value store SCD 3 in the repository 2 or a withdrawal from to a value store SCD 3 in the repository 2. However, there may be movements of electronic funds from one repository to another repository as a part of the electronic funds management process of the electronic commerce system of FIG. 1 as a whole.

Normal Removal from Operation

When, for maintenance or other service, a repository 2 is to be de-installed from a repository container 12, a deactivate control sequence is sent to the repository 2 from the computer system 7 that conditions the repository for removal from service. Typically, but not necessarily, in preparation for removal, the computer system 7 will transfer all electronic funds out of the repository 2 that is to be de-installed into another repository 2. Alternatively, or additionally, the computing system 7 may otherwise deactivate the security controlled devices 3 in the repository 2 to be de-installed. In either case, with the ability to access electronic funds in the repository 7 disabled, there is little incentive for theft of the repository 2 or security controlled devices 3.

Repository 2 and security controlled devices 3, at a later time, can be reinstalled into the same or a different system and placed into operation after reactivating with a normal reactivate control sequence, if required.

Intrusion or Exceptional Removal

On detection of unexpected intrusion (tampering), unexpected power loss, unexpected connection loss or other disruption of communication, or specific request from the computer system 7, SDC repository 2 deactivates the security controlled devices 3. Depending on the specific design of the security controlled devices 3 and of the processor unit 4, deactivating may involve one or both of removing value data from selected ones or all of the security controlled devices 3 and locking of ones or all of the security controlled devices 3. The process of deactivation may be accomplished solely by the processor unit 4, or in cooperation with the container security unit 6 and computer system 7. The process of removing value data typically requires cooperation of the computer system 7 to move the value data to a different, possibly remote, location. Locking each of the security controlled devices 3 within a repository 2 prevents some or all further operations without exceptional intervention. Deactivation, by either or both removing value data or locking the security controlled devices 3, eliminates incentives for theft. Exceptional intervention is an administratively secure recovery procedure that is performed to recondition a repository for further use and for recovery of the electronic funds or other value data contained therein at the time of the exceptional condition.

Methods of Locking

Many methods for locking security controlled devices 3 are possible depending on the design of the security controlled devices 3. The present invention does not depend on any particular locking scheme. The following are examples of locking schemes.

Some security controlled devices 3 automatically lock-up through operation of lock unit 29 after a number of purposeful or not-purposeful unsuccessful unlock attempts detected by unlock unit 28. Funds then may be recovered only by an exceptional secure recovery procedure (backdoor mechanism) under authorized control.

Each of the repositories 2 may be designed to contain a PIN (or PINs) that function as a locking encryption key to lock the security controlled devices 3 on intrusion. Depending on the design of the security controlled devices 3 and the processor unit 4, the PIN can be stored only in the value store or can be stored elsewhere in the repository 2 such as in memory that forms part of the processor unit 4. In the second case, security is improved by having the PIN erased in the repository 2 after its use. In either case, the security controlled devices 3 are locked with the PIN (or PINs) that function as locking encryption keys.

In order to recover the electronic funds or other value data after an intrusion, PINs must be recovered. In practice, security is improved if PINs or the ability to generate PINs is not contained anywhere in the FIG. 2 repository. For example, the PIN's for each repository can be stored in a physically secure and remote place. Alternatively, PIN's are generated using cryptographic techniques that depend on private knowledge of a security manager or require possession of a special security device used for restoring security controlled devices to normal operating conditions.

Figure 3:
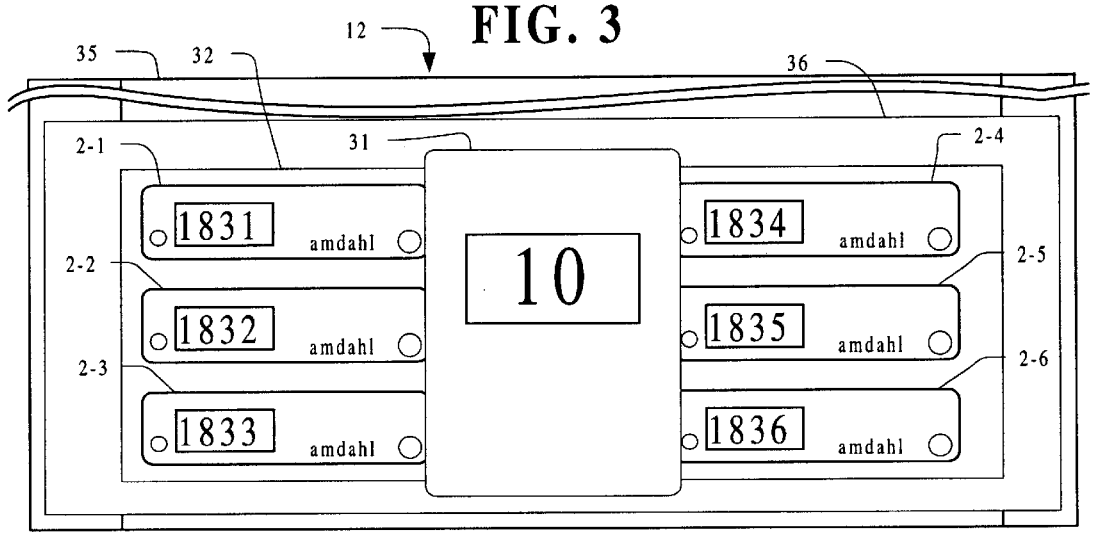
FIG. 3 depicts a front view of a repository container of FIG. 2 with a container door closed.
Figure 4:
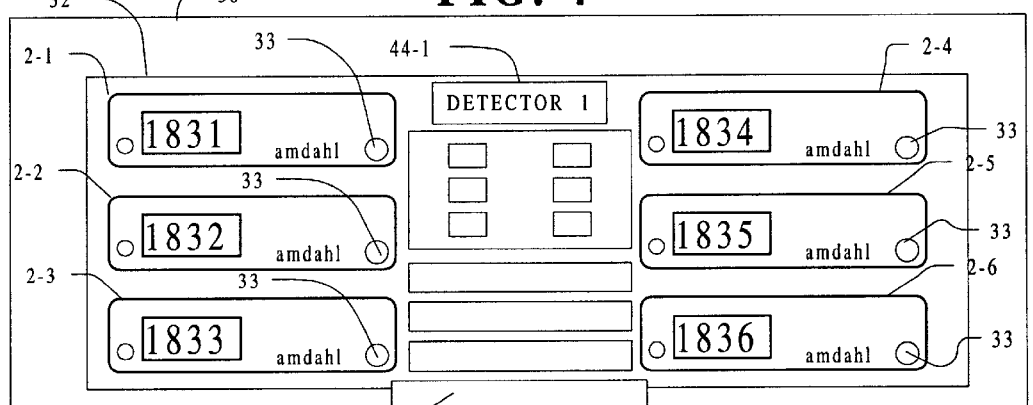
FIG. 4 depicts a front view of a repository container of FIG. 1 with the container door open.
Figure 5:
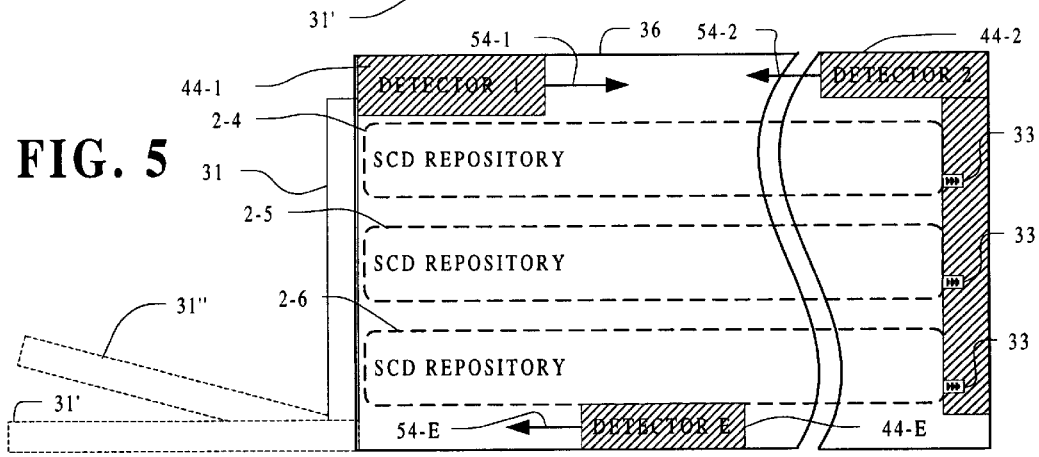
FIG. 5 depicts an end view of the repository container of FIG. 2 and FIG. 3.

Repository Container Physical Detail—FIG. 3, FIG. 4 and FIG. 5

In FIG. 3, a front view of repository container 12 of FIG. 1 is shown in the form of a standard electronic shelf-mounting rack 35. Rack 35 can receive one or more of repository shelves 36. Enclosure 32 in repository shelf 36 encloses the SCD repositories 2-1, 2-2, . . . , 2-6. The SCD repositories 2-1, 2-2, . . . , 2-6 for installation are insertable into and for de-installation are removable from the shelf 12. The repository door 31 is shown closed in FIG. 3 so as to retain the SCD repositories 2 in the installed position.

In FIG. 4, the repository shelf 36 of FIG. 3 is shown, with the repository shelf door 31' in the fully open position. In the open position, the SCD repositories 2-1, 2-2, . . . , 2-6 can be installed and de-installed by insertion into or removal from the enclosure 32. In FIG. 4, the detector 44-1 is positioned to sense the open condition of the repository shelf door 31. Also, the SCD repositories 2-1, 2-2, . . . , 2-6 typically include a keyed lock 33 which after unlocking requires unscrewing in order to release the SCD repositories 2 so they become de-installed by removal from the enclosure 32.

In FIG. 5, a side view of the repository shelf 36 of FIG. 3 and FIG. 4 is shown. The repository shelf door 31 is moveable to different positions such as the fully open position 31' and the partially open position 31". The detector 44-1 senses the open position and provides an open signal when the repository shelf door 31 is not closed. The open signal appears on the line 54-1 which connects to the container control unit 65 in FIG. 6. In FIG. 5, the detector 44-2 is an intrusion detector which detects, in one example, the presence of the engagement screws 33 of the SCD repositories 2 and which connects to the container control unit 65 of FIG. 6. Alternate or additional means may be used to sense disengagement of the repository 2, such as sensing electrical disconnection of the repository 2 from the repository container 12. Only the screws 33 for the SCD repository 2-4, 2-5 and 2-6 are shown by way of example in FIG. 5.

The physical details of the repository rack 35 and shelf 36 in FIG. 3, FIG. 4 and FIG. 5 are typical of an embodiment of a repository container 12 designed as a standard electronic rack which supports one or more repository shelves of the repository shelf 36 type. For purposes of the present invention, the term "container" is intended to mean any physical enclosure for securing SCD repositories and generally the container includes a door, cover or other restrainer for restraining the SCD repositories. In FIG. 3, FIG. 4 and FIG. 5, the restrainer for shelf 36 is a door 31 and similarly, each additional shelf like shelf 36 in rack 35 includes a door like door 31. However, any type of restrainer for the SCD repositories 2 can be employed. For example, a single door for the entire rack 35 can be employed avoiding the need for a separate door 31 for each shelf 36.

Figure 6:
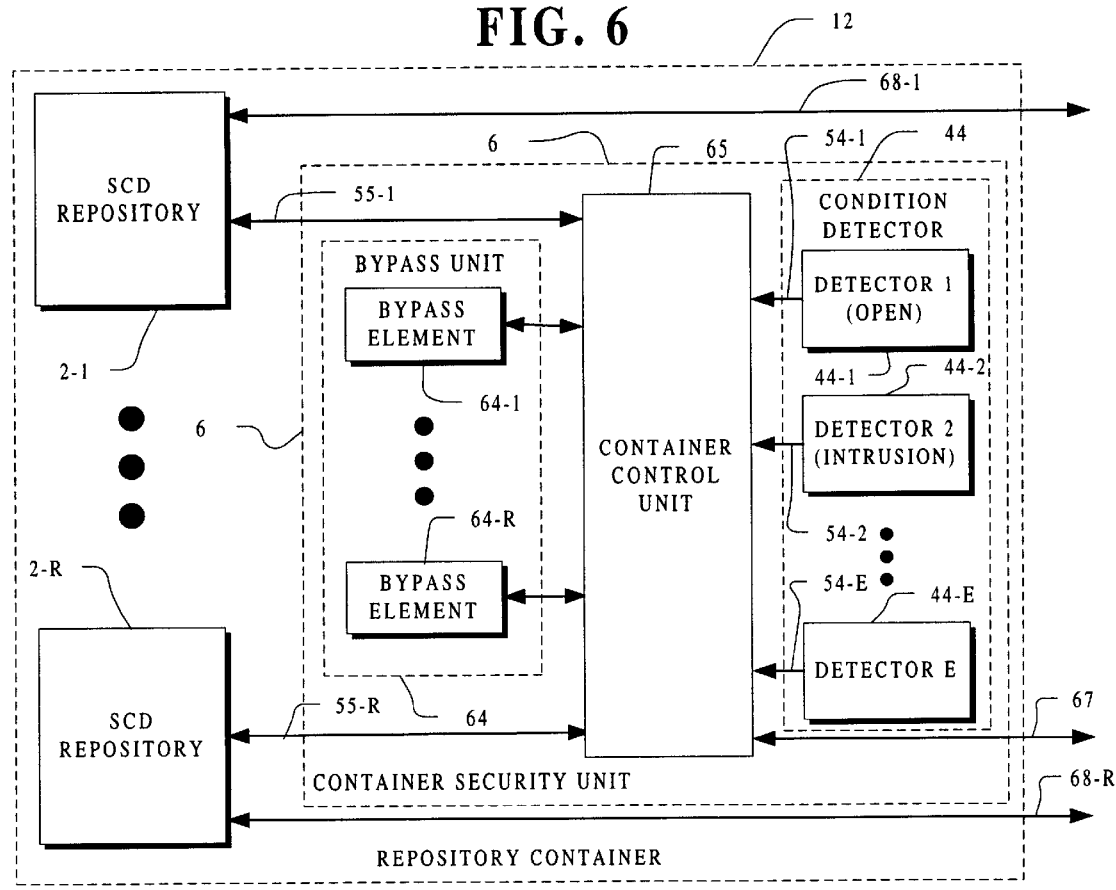
FIG. 6 depicts a block diagram representation of repository container of FIG. 1.

In FIG. 5, the detector 44-E is typical of other detectors included within the repository container 12 and includes for example control logic which functions in response to loss of power, communication loss, sensing of combinations of door open and door lock engagement or disengagement, or other security-compromising events to provide signals on lines 54-E to the container control unit 65 of FIG. 6.

Repository Container Logical Detail—FIG. 6

In FIG. 6, the repository container 12 of FIG. 1 is shown in greater detail. The repository container 12 includes the SCD repositories 2 including SCD repositories 2-1, . . . , 2-R and the container security unit 6 includes a shelf control unit 65, a bypass unit 64 and a detector unit 44. The detector unit 44 includes detector 44-1 (open), detector 44-2 (intrusion) and other detectors including detector 44-E as described in connection with the implementation of FIG. 5. In one particular embodiment, the bypass unit 64 includes the bypass elements 64-1, . . . , 64-R which correspond one for one to the SCD repositories 2-1, . . . , 2-R, respectively The container control unit 65 connects directly to the SCD repositories 2 via the lines 55-1, . . . 55-R and connects via lines 67 to the client system 11 of FIG. 1. The SCD repositories 2-1, . . . , 2-R connect via lines 68-1, . . . , 68-R to the client system 11 of FIG. 1. The bypass unit 64 functions to bypass any ones of the SCD repositories 2-1, . . . , 2-R that may be absent or marked as inactive for purposes of maintenance, repair or other system service. Activation of the repository bypass unit 64 provides a signal to the container security unit 65 and may cause disconnection of power to one or more of the SCD repositories 2. The operation of the repository container 12 of FIG. 6 is to sense detection signals from the condition detector 44 and responsively have the container control unit 65 pass control signals to the SCD repositories 2-1, . . . , 2-R. These control signals are provided under control of signals from the client system 11 with the conditions imparted by any of the bypass signals from the bypass unit 64.

The value data system of FIG. 1 provides client signals on lines 67, from the client system 11 of FIG. 1, for selecting in bypass unit 64 ones of the repositories 2 to be bypassed. The selection is made in one embodiment by enabling selected ones of the bypass elements 64-1, . . . , 64-R. The container control unit 65 in such an embodiment senses which of the bypass elements 64 are enabled. Ordinary security signals (for example, open signals) from or for ones of the repositories 2-1, . . . , 2-R are ignored for as long as the corresponding ones of the bypass elements 64-1, . . . , 64-R remain enabled. The bypass elements 64 are enabled, in one embodiment, for a service time duration specified by the client system 11 and become disabled automatically when the time expires. In another embodiment, ones of the repositories 2 that are planned by the client system 11 to be missing or otherwise are planned to be deactivated have a corresponding bypass element 64 enabled for as long as the planned deactivation exists. In such embodiments, repository container 12 cooperates with the service operations of the client system 11 and participates in a multi-tier security control structure.

In one feature of the value data system multi-tier control structure, one or more repositories 2 operate in a first tier wherein security controlled devices in the repositories 2 are deactivated in response to security control signals generated in the first tier.

In one feature of the multi-tier control structure, the container security unit 12 is in a second tier wherein security signals from the second tier are passed on lines 55-1, . . . , 55-R to the repositories 2 in the first tier to deactivate the repositories 2.

In one feature of the multi-tier control structure, the client system 11 of FIG. 1 is in a third tier and client signals from the third tier are passed directly on lines 68-1, . . . , 68-R to said first tier to deactivate selected ones of the repositories 2. Alternatively, the client signals on lines 67 are passed indirectly through the second tier to the first tier to deactivate the repositories 2. Specifically, the client signals on lines 67 are passed to the container control unit 65 which in turn processes them considering conditions in bypass unit 64 and condition detector 44 and forwards the security signals on lines 55-1, . . . , 55-R to the repositories 2 in the first tier.

In one feature of the multi-tier control structure, the client signals from the third tier generate service signals to designate repositories 2 that are scheduled for service and otherwise to control operations of the multi-tier security structure. In one embodiment, the control algorithms of the client system 11 are downloaded to the container control unit 65 and are executed in container control unit 65. In such a downloaded embodiment, modification of the downloaded control algorithms are prohibited in order to preserve the integrity of the three-level multi-tier structure whereby only the third tier can modify the configuration of and servicing of the repositories 2. While the third tier can modify the configuration of and servicing of the repositories 2, the first and second tiers are fail-safe in that exceptional-condition signals from the first or second tiers operate, under appropriate conditions, to deactivate the repositories 2 without need of higher level tier operations.

Figure 7:
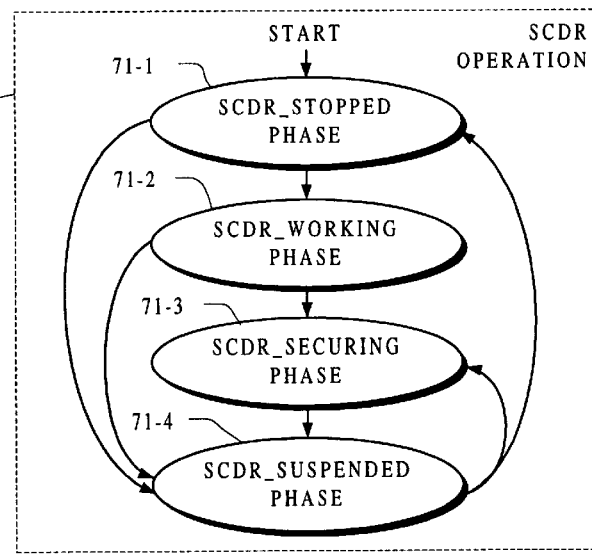
FIG. 7 depicts a block diagram representation of the operation between the phases of the security controlled device repository (SCDR) of FIG. 2.

SCDR Operation Phases—FIG. 7

In FIG. 7, the different phases of operation of the SCD repository 2-1 of FIG. 2 are shown and include the SCDR_STOPPED PHASE 71-1, the SCDR_WORKING PHASE 71-2, the SCDR_SECURING PHASE 71-3, and the SCDR_SUSPENDED PHASE 71-4. In the following descriptions, typical operations of an SCD repository 2-1 of FIG. 2 are described as if the contained security controlled devices 3 were value stores (value store SCD).

In response to applying power or a reset, the SCD repository 2 initiates processing in the SCDR_STOPPED PHASE 71-4. The SCDR_STOPPED PHASE 71-1 determines the condition of the system and, if processing can proceed, the SCDR_STOPPED PHASE 71-1 and flows to the SCDR_WORKING PHASE 71-2, and to the SCDR SUSPENDED PHASE 71-4 otherwise. The SCDR_WORKING PHASE 71-2 supervises the processing that allows the processing associated with transfer of value data between the security controlled device 3 and the client 10 of FIG. 1 to occur under normal secure circumstances as a result of operation of the computer 7 and the client 10. The flow includes tests for system security violations that include exceptional conditions, for example, a SYSTEM_GOOD test, a POWER_FAIL_IMMINENT test, a COMMS_OK test, a REPOSITORY_INTRUSION test, and a SECURE_REQ test. Under any one or more possible security violations, the SCDR_WORKING PHASE 71-2 flows control to the SCDR_SECURING PHASE 71-3. The SCDR_SECURING PHASE 71-3 deactivates the security controlled devices 3 so that no further transfer of value data can occur. After deactivating the security controlled devices 3, the SCDR_SECURING PHASE 71-3 flows to the SCDR_SUSPENDED PHASE 71-4. The SCDR_SUSPENDED PHASE 71-4 can also be entered by flow from the SCDR_WORKING PHASE 71-2. In the SCDR_SUSPENDED PHASE 71-4, the SCD repository 2 is not responsive to some or all security threats, allowing removal or service of the repository. The SCDR_SUSPENDED PHASE 71-4 flows to the SCDR_STOPPED PHASE 71-1 on receipt of a RESUME_REQ request from computer system 7, as the result of a POWER_FAIL_IMMINENT test, or as the result of a SYSTEM_GOOD test. The SCDR_SUSPENDED PHASE 71-4 flows to the SCDR_SECURING PHASE 71-3 on the receipt of a secure request from the computer system 7.

The operation of the phases of FIG. 7 ensures that upon any detection of the exceptional conditions of a potential security breach, either directly through intrusion (tampering) or indirectly through a power failure or loss of communications the operating ones of security controlled devices 3 are immediately deactivated so that transfer of value data from the security controlled device 3 cannot be achieved until the security controlled devices 3 are once again reactivated. In this manner, the system operates to thwart interference with the SCD repository 2 and unauthorized transfer of value data from the security controlled devices 3.

SCDR STOPPED PHASE—FIG. 8

Figure 8:
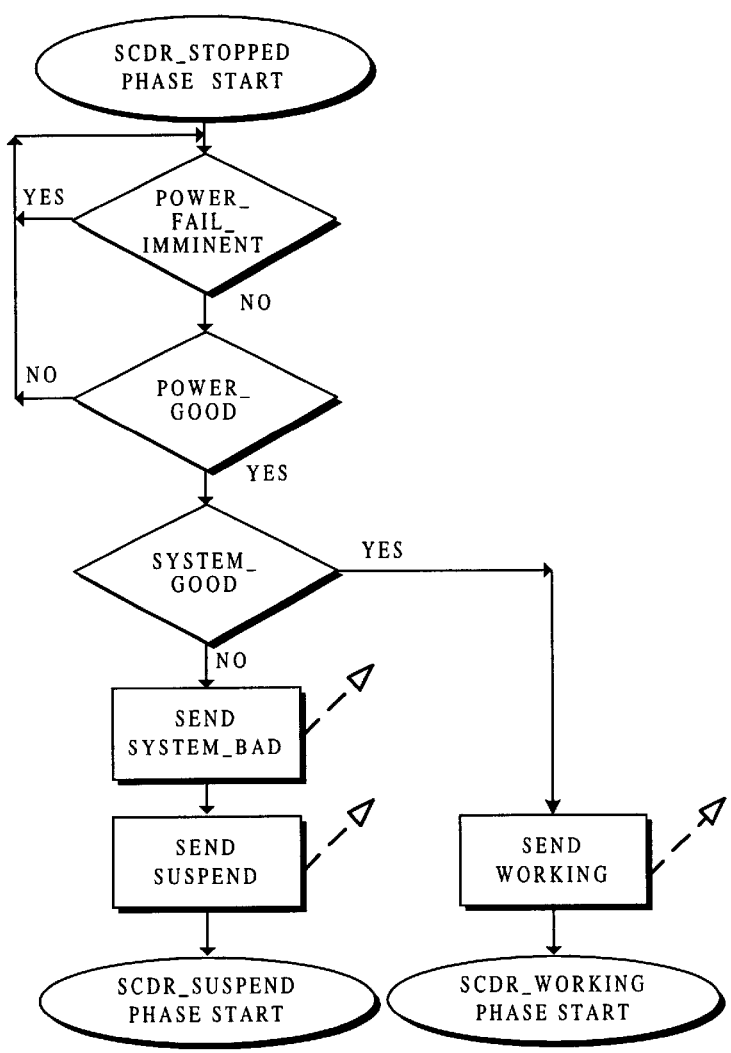
FIG. 8 depicts a block diagram representation of the SCDR stopped phase of FIG. 7.

The SCDR_STOPPED PHASE 71-1 of FIG. 7 is shown in further detail in flow chart form in FIG. 8. In FIG. 8, the SCDR_STOPPED PHASE START state flows to the test for loss of external power (POWER_FAIL_IMMINENT). The POWER_FAIL_IMMINENT test gives a YES result if the power detect unit 23 signals a power_fail_imminent condition as the result of a determination that there is a reduction in the voltage or other abnormal condition on the external power source, and otherwise gives a NO result. A YES result from the POWER_FAIL_IMMINENT test returns to the beginning after the SCDR_STOPPED PHASE START and prevents further processing until power failure ceases to be imminent. A NO result flows to the power good test (POWER_GOOD). The power good test gives a YES result if the power detect unit 23 determines that power has been restored to a stable and adequate operating level from a previous power failure condition, and otherwise gives a NO result. A NO result flows to the POWER_FAIL_IMMINENT test after the SCDR_STOPPED PHASE START and prevents further processing until a YES result occurs for the power good test. A YES result for the POWER_GOOD test flows to the system good test (SYSTEM_GOOD). Depending on the internal state of the repository 2, the SYSTEM_GOOD test may cause execution of internal diagnostic procedures. The SYSTEM_GOOD test gives YES result if there are no internally detected failures in the SCD repository 2, and otherwise gives NO result. A NO result for the SYSTEM_GOOD test flows to the send system bad task (SEND SYSTEM_BAD) which sends a SYSTEM_BAD advisory to computer system 7. Diagrammatically, tasks, such as SEND_SYSTEM_BAD that cause advisories to be sent to computer system 7 are flagged by a heavy dotted line with an open arrow head pointed up and to the right. The SEND_SYSTEM_BAD task flows and flows to the send suspended task (SEND SUSPENDED) which sends a SUSPENDED advisory to computer system 7 and flows to the SCDR_SUSPENDED PHASE START of FIG. 11.

Figure 9:
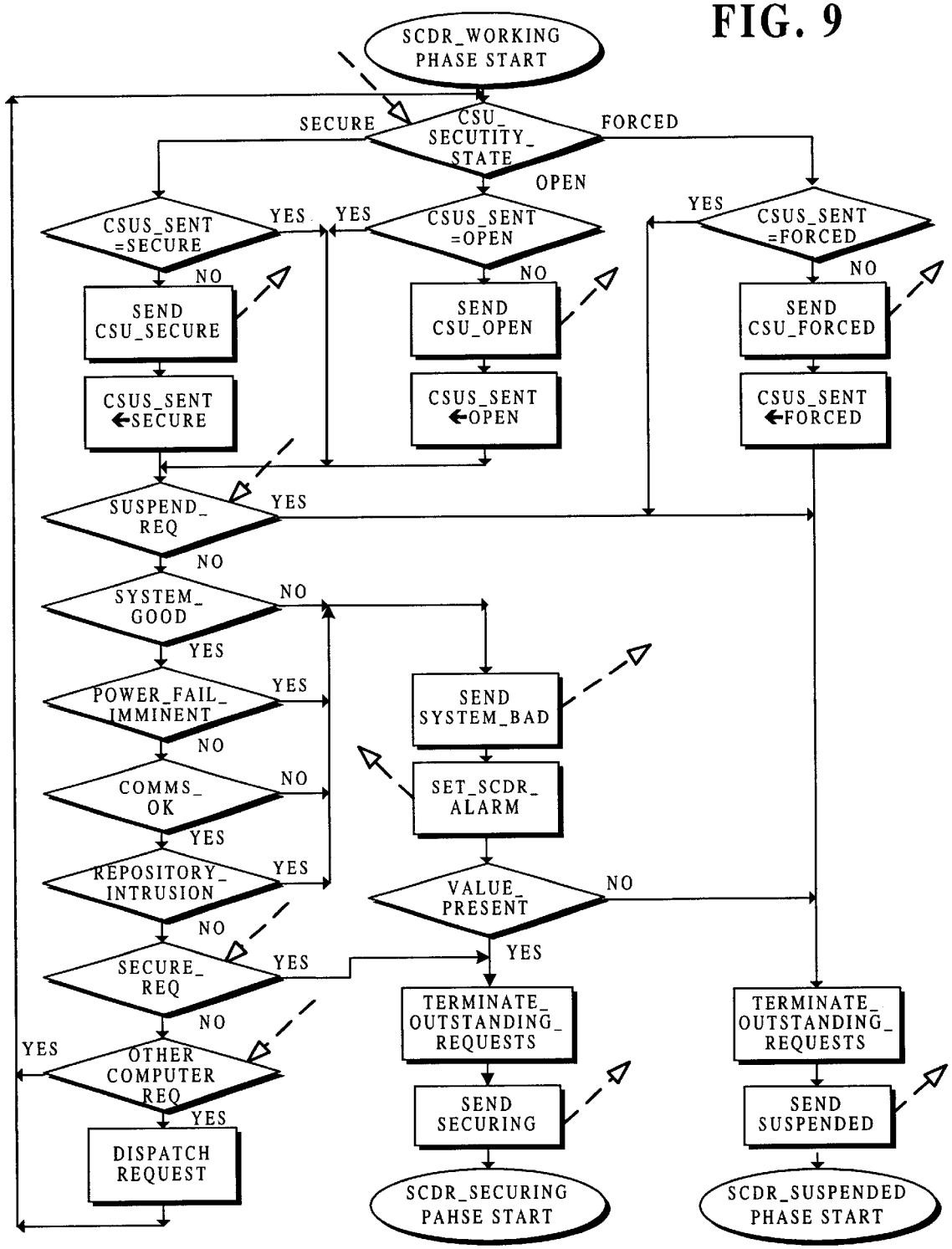
FIG. 9 depicts a block diagram representation of the SCDR working phase of FIG. 7.

A YES result on the SYSTEM_GOOD test flows to the send working task (SEND WORKING) which sends a WORKING advisory to computer system 7 and flows to the SCDR_WORKING PHASE START of FIG. 9.

SCDR WORKING PHASE—FIG. 9

The SCDR_WORKING PHASE 71-2 of FIG. 7 is shown in flow chart form in FIG. 9. The WORKING PHASE START of FIG. 9 flows to the test on security signals 55 from the container control unit 65 to the container alarm unit 24 that report the security state of the repository container 12 (CSU_SECURITY_STATE). CSU_SECURITY_STATE includes security_compromized conditions reported on line 54-2 by the condition detector 44 of FIG. 6. Diagrammatically, tests, such as CSU_SECURITY_STATE, that depend on the state of the repository container 12 are flagged by a heavy dotted line with an open arrow head pointed down and from the left. The CSU_SECURITY_TEST returns FORCED if the condition detector 44 signals a severe security on line 54-2 by the condition detector 44 of FIG. 6, or by other detected conditions. FORCED may be the result of any of many different attacks, may include removal of mounting screws 33 or other securing devices, force that causes physical distortion, or sensing of an open condition of an access door, cover or other restraining device while the associated lock or locks have not been disengaged. The CSU_SECURITY_TEST returns OPEN if the CSU detects conditions of lower security that may be compatible, but is not necessarily compatible, with normal service or maintenance. OPEN conditions include conditions where the normal access doors and covers of the container are not closed and secure, or if the SCDR 2 is not mounted in a repository container 12. The CSU_SECURITY_TEST returns SECURE if neither the FORCED nor the OPEN condition applies.

The CSU_SECURITY_STATE test flows to one of three tests on the shelf security unit security state variable (CSUS): CSUS_SENT=SECURE; CSUS_SENT=OPEN; or, CSUS_SENT=FORCED. These tests on the SUSS_SENT state variable return a YES if the current security state of the repository container 12, as returned by the previous CSU_SECURITY_STATE test, matches the current value of the CSU-SECURITY STATE variable, and NO otherwise. A NO result to one of these tests flows to the task that sends the appropriate advisory: SEND CSU_SECURE; SEND CSU_OPEN; or SEND CSU_FORCED. SEND CSU_SECURE sends a SECURE advisory to computer system 7. SEND CSU_OPEN sends an OPEN advisory to computer system 7. SEND CSU_FORCED sends an FORCED advisory to computer system 7. In each case, the flow is from sending the advisory to a task that sets the CSU_SENT state variable to indicate that the advisory has been sent: CSUS_SENT←SECURE; CSUS_SENT←OPEN; or, CSUS_SENT←FORCED.

Flow is to the test which checks for a suspend request from computer system 7 (SUSPEND-_REQ) in the four cases: (1) a YES result on the CSUS_SENT=SECURE test; (2) a YES result on the CSUS_SENT=OPEN test; (3) the CSUS_SENT←SECURE task; or (4) the CSUS_SENT←OPEN task. Diagrammatically, tasks, such as SUSPEND_REQ, that depend on requests from computer system 7 are flagged by a heavy dotted line with an open arrow head pointed down and from the right. The SUSPEND_REQ test gives a YES result if computer system 7 has delivered a new suspend request to the SCD repository 2, and otherwise gives a NO result. A NO result of the SUSPEND_REQ test flows to the SYSTEM_GOOD test.

A YES result from the SYSTEM_GOOD test flows to the POWER_FAIL_IMMINENT test. A NO result from the POWER_FAIL_IMMINENT test flows to the COMMS_OK test. A YES result from the COMMS_OK test flows to the REPOSITORY_INTRUSION test. A NO result on the REPOSITORY_INTRUSION test flows to the secure request test (SECURE_REQ). The SECURE_REQ test gives a YES result if computer system 7 has delivered a new secure request to the SCD repository 2 and otherwise gives a NO result. A NO result of the SECURE_REQ test flows to the test for other computer requests (OTHER COMPUTER REQUEST).

The OTHER COMPUTER REQUEST gives a YES result if a new valid request has been received from the computer system 7 by the SCD repository 2 and otherwise gives a NO result. A NO result of the OTHER COMPUTER REQUEST test returns to the CSU_SECURITY_STATE test after the SCDR_WORKING PHASE START. A YES result flows to the DISPATCH REQUEST task which causes the initiation of the request received from computer system 7. Possible requests include directives to transfer value between a security controlled device 3 and a client 10, other directives necessary or desirable for the management of the SCD repository 2, or a directive to deactivate or activate one or more security controlled devices 3. A deactivate directive may specify use of a key or keys included or otherwise associated with the directive, or may specify use of an key previously stored in the SCD repository 2 or a random key generated in the SCD repository 2. If the security controlled device 3 has an internal generated deactivate mechanism, the deactivate directive may specify activation of that mechanism. After action specified by the deactivate directive is complete, the key or keys used, if any, may be deleted from storage in the SCD repository 2, thus making the keys not available to an intruder by inspection or dismantling of the SCD repository 2. An reactivate directive may specify use of a key or keys included or associated with the directive, or may specify use of an key previously stored in the SCD repository 2 or a random key generated by the processor unit 7. Deactivate directives may be part of a normal deactivate control sequence. If the security controlled device 3 has an internal unlocking mechanism that depends on the use of a backdoor, the reactivate directive may use that mechanism. After the DISPATCH REQUEST task, flow returns to the CSU_SECURITY_STATE test after the SCDR_WORKING PHASE START.

A NO result from the SYSTEM_GOOD test, or a YES result from the POWER_FAIL_IMMINENT test, or a NO result to the COMMS_OK test, or a YES result from the INTRUSION test flows to the SEND SYSTEM_BAD task which flows to the task (SET_SCDR_ALARM) that sets an alarm signal to the repository container 12 containing the SCR depository. Diagrammatically, tasks, such as SET_SCDR_ALARM that cause state to be sent to the repository container 12 are flagged by a heavy dotted line with an open arrow head pointed up and to the left. The SET_SCDR_ALARM task flows to the a test (VALUE_PRESENT) that determines if there reason to protect the Security controlled devices 3 in the SCDR. The VALUE PRESENT test returns a YES result if either there are resources in one or more Security controlled devices 3 that require protection or it is not possible to determine if such resources are present, and a NO result otherwise.

Any one of four conditions will flow to the TERMINATE_OUTSTANDING_REQUESTS task: (1) a NO result to the VALUE_PRESENT test, (2) a YES result of the SUSPEND_REQ test, or (3) a NO result to the CSUS_SENT=FORCED test, or (4) the completion of the CSUS_SENTβFORCED task. The TERMINATE_OUTSTANDING_REQUESTS task causes the SCD repository 2 to abort or otherwise stop all in process and pending transactions that may have been initiated by computer system 7. The TERMINATE_OUTSTANDING_REQUEST task which follows one of these three conditions flows to the SEND SUSPENDED task which flows to the SCDR_SUSPENDED PHASE START state of FIG. 11.

A YES result of the SECURE_REQ test or a YES result to the VALUE PRESENT test flows to the TERMINATE_OUTSTANDING_REQUESTS task which flows to the send securing task (SEND SECURING) which sends a security advisory to computer system 7. The SEND SECURING task flows to the SCDR_SECURING PHASE START of FIG. 10.

SCDR SECURING PHASE—FIG. 10

Figure 10:
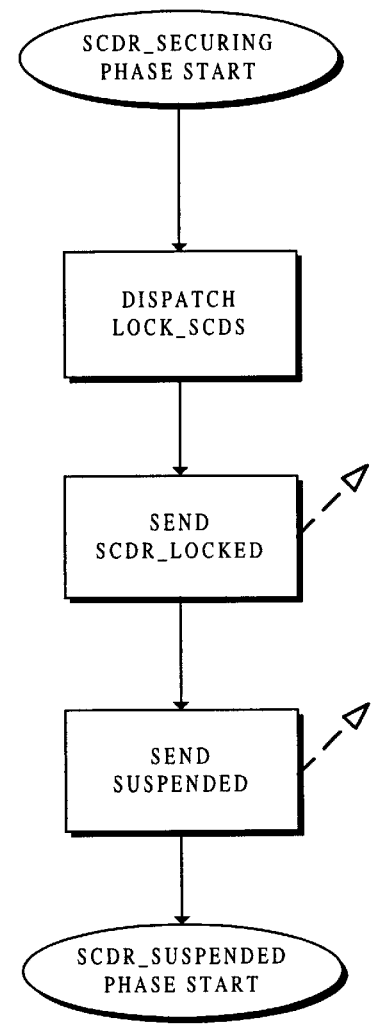
FIG. 10 depicts a block diagram representation of the SCDR securing phase of FIG. 7.

In FIG. 10, the SCDR_SECURING PHASE 71-3 starts with SCDR_SECURING PHASE START which flows to the task which dispatches the directive to deactivate the security controlled devices 3 (DISPATCH LOCK_SCDS). The DISPATCH LOCK_SCDS task has the function of immediately deactivating all security controlled devices 3 so that any further access to the security controlled devices 3 is prevented until the security controlled devices 3 are again reactivated. The DISPATCH LOCK_SCDS task flows to the send security controlled devices locked task (SEND SCDR_LOCKED). The SEND SCDR_LOCKED task sends an SCDR_LOCKED advisory to computer system 7 indicating that the security controlled devices 3 in the SCD repository 2 are deactivated and flows to the SEND SUSPENDED task which transfers to the SCDR_SUSPENDED PHASE START of FIG. 11.

The DISPATCH LOCK_SCDS task can be carried out in a number of different ways. In one example, if a PIN is stored in the security controlled devices 3 to be deactivated, then a simple lock command to the security controlled device from the processor unit 4 may be all that is required to implement this task.

In other embodiments of security controlled devices 3, a PIN must be supplied together with the lock command in order for the security controlled devices 3 to recognize the lock command. In such an embodiment, the PIN is stored in the processor 4 of FIG. 1 and is accessed and used as part of the DISPATCH LOCK_SCDS task to effectuate the locking of the security controlled devices 3. Once the PIN has been accessed and used from the processor 4 to lock the security controlled devices 3, the PIN is typically erased.

In another embodiment where the security controlled devices 3 react to multiple attempts to lock the security controlled device 3 by executing an internal sequence to lock the security controlled device 3, the task causes the multiple attempts and the security controlled device 3 becomes locked by its own internal operation and is only unlockable by accessing the appropriate external unlocking codes.

SCDR SUSPENDED PHASE—FIG. 11

Figure 11:
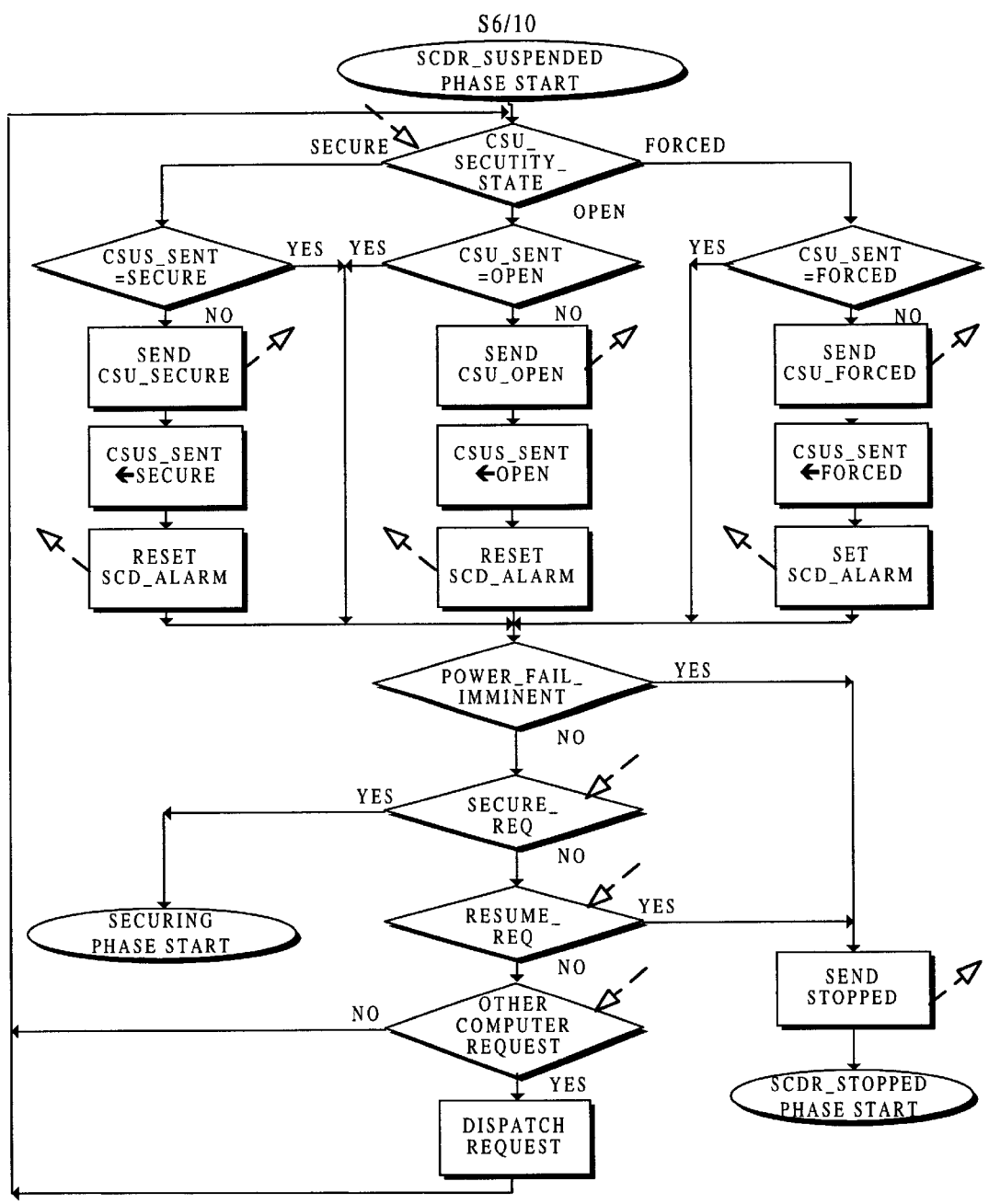
FIG. 11 depicts a block diagram representation of the SCDR suspended phase of FIG. 7.

The SCDR_SECURING PHASE 71-4 of FIG. 7 is shown in flow chart form in FIG. 11. The SECURING PHASE START of FIG. 9 flows to the test on CSU_SECURITY_STATE. The CSU_SECURITY_STATE test flows to one of three tests on the shelf security unit security state variable (CSUS): CSUS_SENT=SECURE; CSUS_SENT=OPEN; or, CSUS_SENT=FORCED. A NO result to one of these three tests flows to the three tasks that send appropriate advisories to the computer system 7, set the CSU_SENT state variable to indicate that the advisory has been sent and then set or reset SCDR_ALARM to the repository container 12: SEND CSU_SECURE flowing to CSUS_SENT←SECURE flowing to RESET SCDR_ALARM; SEND CSU_OPEN flowing to CSUS_SENT←OPEN flowing to RESET SCDR_ALARM; or, SEND CSU_FORCED flowing to CSUS_SENT←FORCED flowing to SET SCDR_ALARM.

Flow is to the SUSPEND_REQ after a YES result to one of the three tests on the CSUS_SENT state variable, or after an assignment to the CSUS_SENT state variable. A NO result of the SUSPEND_REQ test flows to the POWER_FAIL_IMMINENT test.

A YES result of the POWER_FAIL_IMMINENT test flows to the SECURE_REQ test. A YES result to the SECURE_REQ test flows to transfers to the SCDR_SECURING PHASE START of FIG. 10. A NO result to the SECURE_REQ test flows to the resume request test (RESUME_-REQ). The RESUME_REQ test gives a YES result if computer system 7 has delivered a new resume request to the SCD repository 2, and otherwise gives a NO result.

A NO result of the RESUME_REQ test flows to the OTHER COMPUTER REQUEST test. A YES result of the OTHER COMPUTER REQUEST test flows to the DISPATCH REQUEST task. Depending on the implementation, the SCDR_SUSPENDED PHASE 71-4 may honor only some of the possible requests. For example, directives to transfer value data between a security controlled device 3 and a client 10 or directives that reactivate one or more security controlled devices 3 may not be allowed. After the DISPATCH REQUEST task, flow returns to the CSU_SECURITY_STATE test after the SCDR_SUSPENDED PHASE START.

A NO result of the OTHER COMPUTER REQUEST test returns to the POWER_FAIL_IMMINENT test after the SCDR_SUSPENDED PHASE START.

A YES result of the RESUME_REQ test or YES result to the POWER_FAIL_IMMINENT test flows to the SEND STOPPED task which sends a STOPPED advisory to computer system 7 and then flows to the SCDR_STOPPED PHASE START of FIG. 9 for reinitialization of the SCDR 2.

Repository—FIG. 12–FIG. 20

Figure 12:
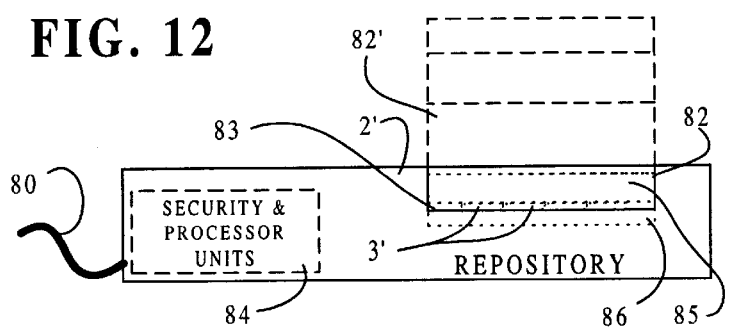
FIG. 12 through FIG. 20 depict schematic representations of the repository of FIG. 2.

In FIG. 12, further details of the repository 2 of FIG. 2 in an implementation containing value store SCDs 3 packaged as miniature smart cards. The repository 2 includes the security and processor units 84, which correspond to the processor unit 4 and repository security unit 5 of FIG. 2, and a plurality of security controlled devices 3. The security controlled devices 3 are within a chamber 83 and physically and electrically engage the base 86. A tray cover 85 engages the top of the security controlled devices 3 which, under the contact pressure of a repository cover 82, forces the security controlled devices 3 into engagement with the base 86.

The cover 82 is hinged to the base 84 and is rotatable as shown to the phantom position 82'. When the cover 82 is opened to position 82', the tray cover 85 can be removed to allow removal of the security controlled devices 3. The repository 2 includes electrical cables 80 for supplying power to and communications to and from the repository 2.

Figure 13:
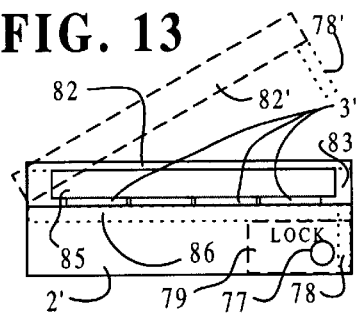

In FIG. 13, an end view of the repository 2 of FIG. 12 is shown. The repository cover 82 in the closed position engages the tray cover 85 which in turn engages the security controlled devices 3 to force the security controlled devices 3 into electrical contact with the base 86 of the SCD repository 2. When the cover 82 is in the closed position, the cover extension 78 engages a lock 79 which locks the cover 82 in the closed position. Lock 79 has a securing mechanism 77 which has a slow release for unlocking the cover extension 78 and cover 82. The securing mechanism 77 is, for example, a fine threaded screw which, in normal operation, takes a delay time to unengage the repository cover extension 78. The design pitch for the screw and the other mechanical design parameters give assurance that absent exceptional means that could cause visible physical damage, the delay time required to disengage the cover 78 is sufficient to allow the security controlled devices 3 to be electronically locked. While a fine threaded mechanical screw is one preferred delay time embodiment, any conventional delay time mechanism can be employed. For example, hydraulic releases with pre-timed delays can be employed and electronic releases with delay counters can be employed. In FIG. 13, the repository cover 82 is shown rotated to the phantom position 82' together with the repository cover extension in the position at 78'. The opening of the repository cover to 82 allows the tray cover 85 to be removed from the opening 83 and thereby to permit the security controlled devices 3 to be de-installed by removal from the base 86.

Figure 14:
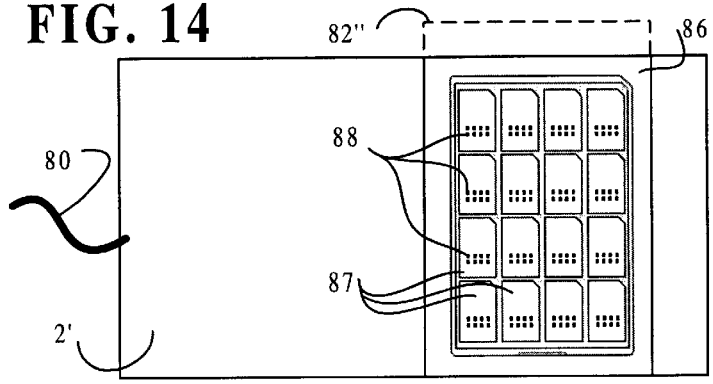

In FIG. 14, a top view of the repository 2 of FIG. 12 is shown. The cover 82 in FIG. 12 is rotated to the vertical position 82" in FIG. 14 to reveal the base 86. The base 86 includes sixteen receiving positions 87 for receiving security controlled devices 3 of FIG. 6. Each of the receiving positions 87 of FIG. 14 includes, in the embodiment shown, eight pressure mounted contacts 88 for making electrical contact to value store SCDs 3. The number of contacts depends on the design of the smart card chip.

Figure 15:
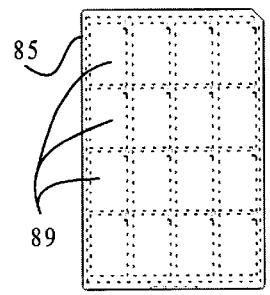

In FIG. 15, a top view of the tray cover 85 is shown. On the bottom side of the tray cover 85 are receiving position slots 89 which are designed to engage security controlled devices 3 when the tray cover 85 is superimposed over the corresponding positions 87 in the repository base 86 of FIG. 14.

Figure 16:
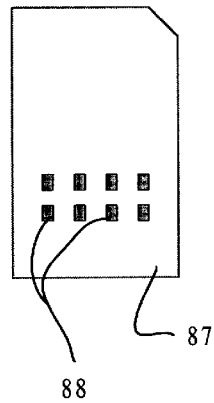

In FIG. 16, a top view of a position slot 87, typical of all sixteen of the position slots 87 in FIG. 14, is shown. The slot 87 includes the pressure actuated contacts 88.

Figures 17, 18:
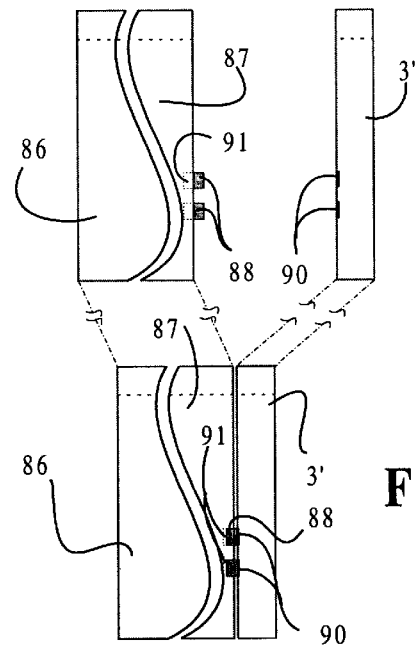

In FIG. 17, a side view of the position slot 87 of FIG. 16 is shown. The position slot 87 includes the pressure actuated contacts 88 which are retractable into the openings 91 into the base 86. The openings 91 include, for example, springs or other mechanisms for forcing the contacts 88 outwardly from the openings 91. Any conventional spring mounted or other pressure contact 88 can be employed.

In FIG. 18, a value store 3', typical of the security controlled devices 3 in FIG. 12 and FIG. 13, is shown. The value store 3' includes the electrical contacts 90 which are located in a position adapted to engage the pressure contacts 88 in the slot 87 of base 86, as shown in FIG. 17.

Figure 19:
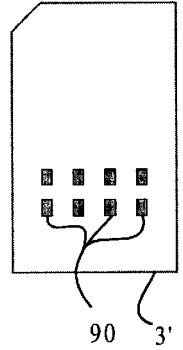
Figure 20:
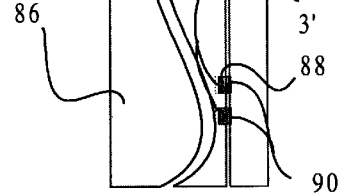

In FIG. 19, a top view of the value store 3' of FIG. 18 is shown, together with the eight contacts 90. In FIG. 20, the value store 3' of FIG. 18 is engaged with the slot 87 of base 86 in FIG. 17, so that the spring loaded contacts 88 engage the contacts 90 in the value store 3'. The FIG. 20 representation of the value store 3' engaged with the slot 87 in base 86 is typical of the engagement that occurs with the cover closed in FIG. 12 and FIG. 13.

By way of summary, FIG. 12 through FIG. 20 represent the aspects of the engagement and disengagement of security controlled devices 3 into and out of the repository 2. The mechanical robustness and corresponding resistance to intrusion of the repository 2 is a matter of design choice. The security units 84 can, as a matter of design choice, include any number of sensing devices. For example, temperature sensing devices, motion sensing devices, tray cover position sensors, repository door position sensors and other conventional sensors may all be employed to sense either the normal condition of the repository 2 or to sense when security of the repository may be in jeopardy. For example, the lock 79 and the lock securing mechanism 77 may include a sensor which detects any unlock motion of the lock securing mechanism 77 to initiate the deactivation of the security controlled devices 3. Since the securing mechanism 77 is designed to include a minimum unlock delay which exceeds the time required to lock the security controlled devices 3, security controlled devices 3 will be automatically locked in response to any unexpected movement of the securing mechanism 77. In this manner, the mechanical security imposed by the repository as described in connection with FIG. 12 through FIG. 20, guarantees to any level of mechanical design that the security controlled devices 3 will be deactivated before an unauthorized intrusion can occur.

Figure 21:
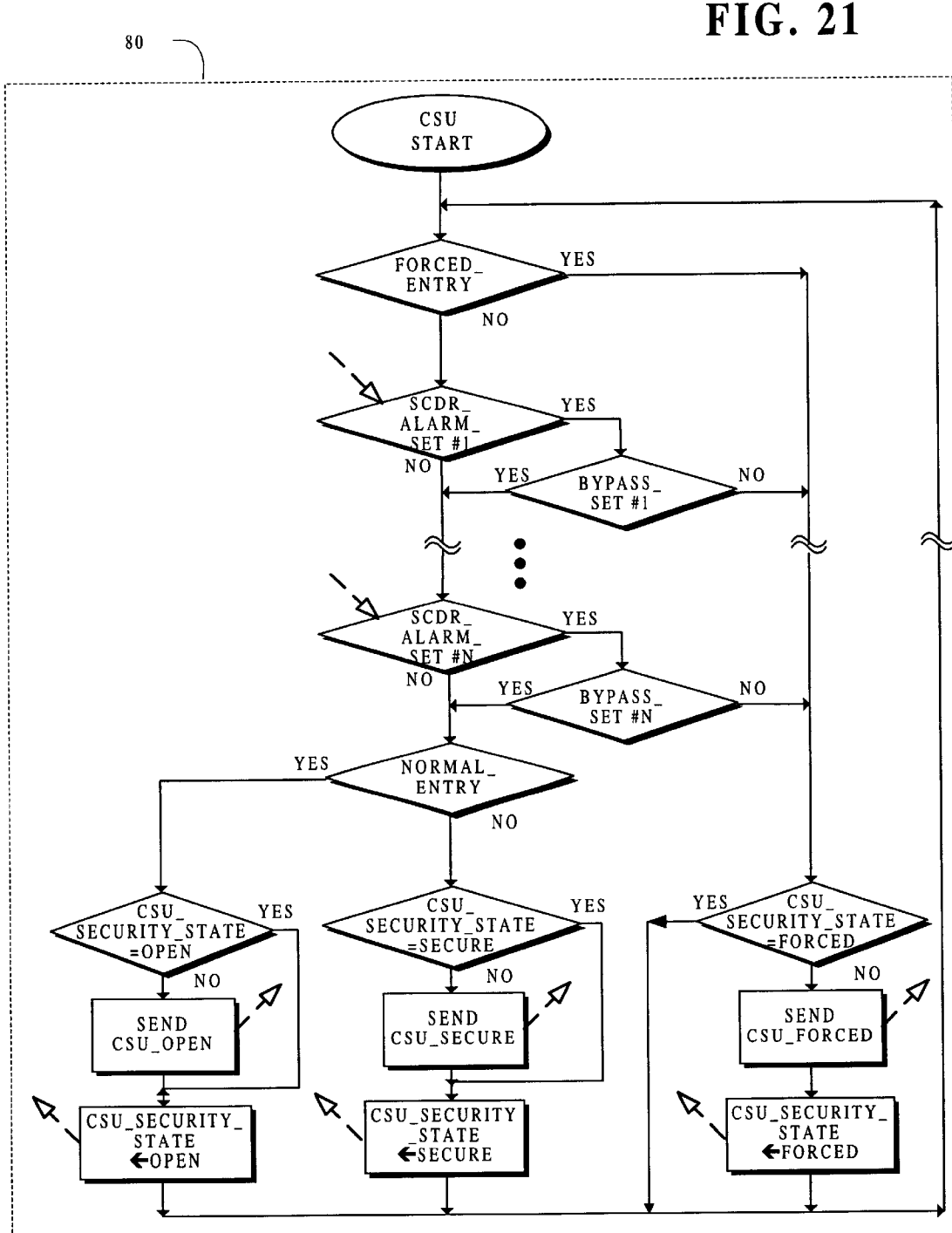
FIG. 21 depicts a block diagram representation of the repository container phase of FIG. 7.

Container Security Unit Processing Logic—FIG. 21

The processing logic of the container security unit (CSU) 6 of the repository container 12 is shown in flow chart form in FIG. 21. When power is applied to the CSU, processing starts with the CSU START of FIG. 21 and flows to the test for forced entry to the repository container 12 (FORCED_ENTRY). The FORCED ENTRY test returns YES result if the detector unit 66 of the repository container 12 detects an entry or attempted entry that can not be adjunct to a normal operations procedure, and a NO result otherwise.

A NO result to the FORCED_ENTRY test flows to one or both of the two tests, ALARM_SET and BYPASS_SET, for each position that could hold a SCD repository 2 in the repository container 12. The two tests are a test of the alarm state of the SCDR that may be in the in the position (ALARM_SET) and a test of the state of the two-state bypass switch mounted on the repository container 12 for that position (BYPASS_SET). The ALARM_SET test for a specific position returns a YES value if there is no SCD repository 2 mounted in that position or if there is an SCD repository 2 12 mounted in that position and that repository has performed a SET_SCDR_ALARM task more recently than it has performed a RESET_SCDR ALARM task, and otherwise returns a NO result. The BYPASS_SET task for a specific SCD repository 2 returns a YES value if the bypass switch for that repository is in the REPOSITORY OFF position, and a returns a NO value if the switch is in the REPOSITORY_ON position. The BYPASS_SET task may send an advisory to the computer system opertions 73 on the change of position of the repository bypass element 64.

If, for all of SCDR positions, either the ALARM_SET test returns a NO result or the BYPASS_SET test returns a YES result, the flow is to a test for a normal service entry (NORMAL_-ENTRY). The NORMAL ENTRY test returns a YES result of the repository container 12 detects that a cover or door of the container has been open in a way that may be consistent with normal maintenance.

If the result of the FORCED_ENTRY test is YES or for any of the SCDR positions the ALARM SET test returns a YES result and the BYPASS_SET test returns a NO result, the flow is to a test which determines if the security state of the repository container 12 has been set to FORCED (CSU_SECURITY_STATE=FORCED).

The CSU_SECURITY_STATE=FORCED test returns a YES if the most recent assignment to the CSU_SECURITY_STATE state variable was FORCED, and otherwise returns a NO result. If the result of the CSU_SECURITY_STATE=FORCED test is YES, the CSU_SECURITY_STATE state need not be updated and flow is back to the FORCED_ENTRY test. If the result of the CSU_SECURITY_STATE=FORCED test is NO, then flow is to the task that may send an advisory to the computer system opertions 73 that informs the computer system opertions 73 that the container has detected a prima-facis security violation (SEND CSU_FORCED) and then to a task that sets the security state of the repository container 12 to the forced state (CSU_SECURITY_STATE←FORCED). Diagrammatically in FIG. 21, tasks that send advisories to the computer system operation 73, such as the SEND CSU_FORCED task, are flagged by a heavy dotted line with an open arrow head pointed up and to the right, and tasks that cause change to the state of the repository container 12 that are visible to the SCD repositories 2, such as the CSU_SECURITY_STATE←FORCED task, are flagged by a heavy dotted line with an open arrow head pointed up and to the left. Reporting of the changed state of the repository container 12 by the repository container 12 itself is redundant since SCD repositories 2 contained in the repository container 12 will, in response to the change of CSU_SECURITY_STATE, also advise the computer system operations 73. This redundancy may be a useful security feature in some implementations, and may be omitted in other implementations. The flow after the CSU_SECURITY_STATE←FORCED task is back to before the FORCED_ENTRY test.

A YES result to the NORMAL_ENTRY test flows to the CSU_SECURITY_STATE=OPEN state variable test. The CSU_SECURITY_STATE=OPEN test returns a YES if the most recent assignment to the CSU_SECURITY_STATE state variable was OPEN, and otherwise returns a NO result. If the result of the CSU_SECURITY_STATE=OPEN test is YES, the CSU_SECURITY_STATE does not need to be updated and flow is back to the FORCED_ENTRY test. If the result of the CSU_SECURITY_STATE=OPEN test is NO, then flow is to the task that may send an advisory to the computer system opertions 73 that informs the computer system opertions 73 that the container has detected an entry to the repository container 12 that is consistent with normal maintenance (SEND CSU_OPEN) and then to a task that sets the security state of the repository container 12 to the OPEN state (CSU_SECURITY_STATE←OPEN). The flow after the CSU_SECURITY_STATE←OPEN task is back to before the FORCED_ENTRY test.

A NO result to the NORMAL_ENTRY test flows to the CSU_SECURITY_STATE=OPEN state variable test. The CSU_SECURITY_STATE=OPEN test returns a YES if the most recent assignment to the CSU_SECURITY_STATE state variable was OPEN, and otherwise returns a NO result. If the result of the CSU_SECURITY_STATE=OPEN test is YES, the CSU_SECURITY_STATE need not be updated and flow is back to the FORCED_ENTRY test. If the result of the CSU_SECURITY_STATE=OPEN test is NO, then flow is to the task that may send an advisory to the computer system operation 73 that the repository container 12 is in a state consistent with normal closed-up operation (SEND CSU_OPEN) and then to a task that sets the security state of the repository container 12 to the OPEN state (CSU_SECURITY_STATE←OPEN). The flow after the CSU_SECURITY_STATE←OPEN task is back to before the FORCED_ENTRY test.

Figure 22:
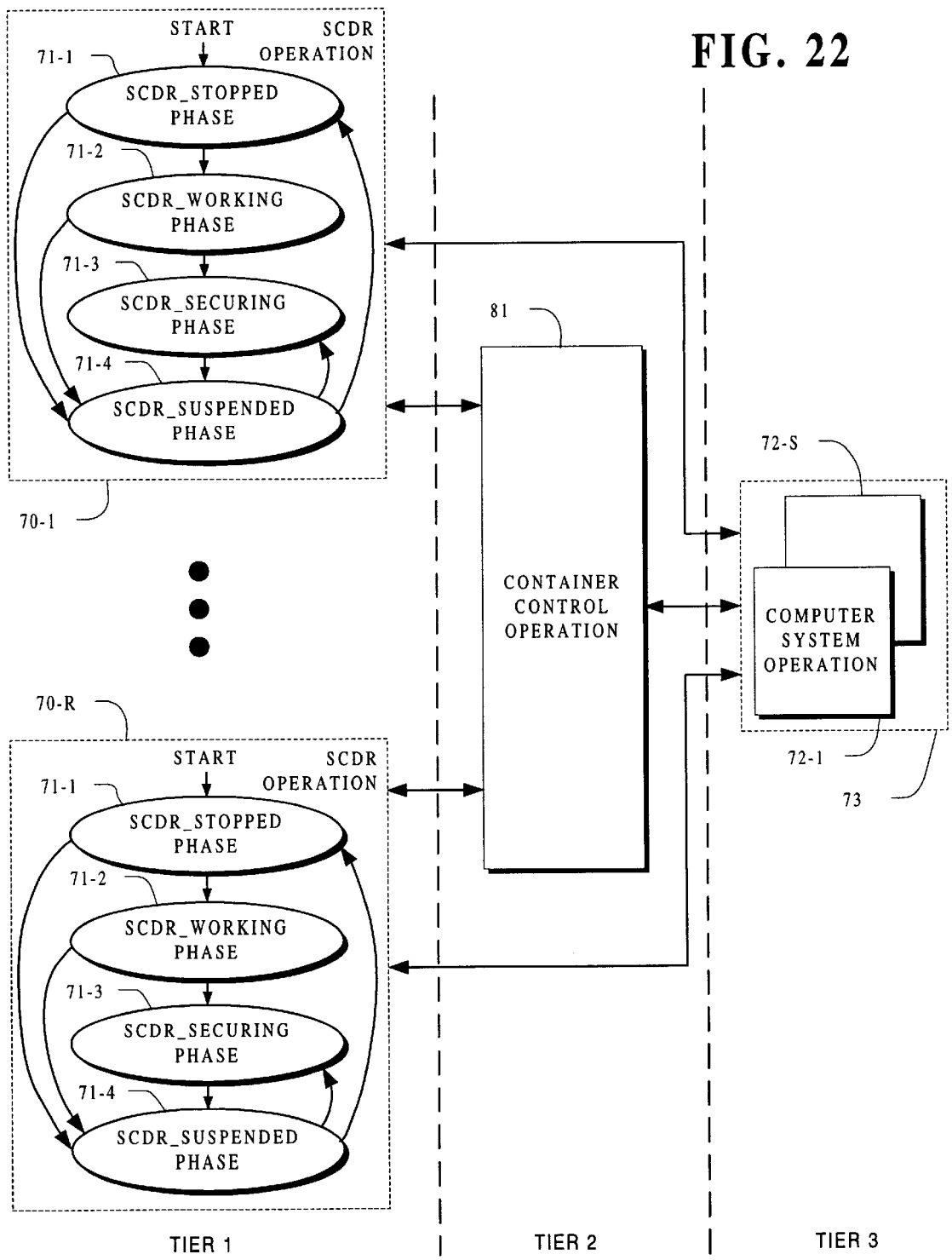
FIG. 22 depicts a block diagram representation of the operation between the tiers of the value data system of FIG. 1.

Multi-tier Operation—FIG. 22

In FIG. 22, the multi-tier operation which controls security in the value data system 1 of FIG. 1 is shown. In tier 1, the SCDR operation for each of the SCD repositories 2 like those of FIG. 2 are shown. Specifically, the SCDR operation 70-1, . . . 70-R corresponds to the SCD repositories 2-1, . . . 2-R of FIG. 1. In FIG. 22, each SCDR operation operates in a manner which can deactivate the SCD repository 2 in the event that security is breached and this operation is carried out internally without any requirement for external security signals from tier 2 or tier 3.

In addition to the internal tier 1, internal security operations of the SCD repositories, the container control operation 81 in tier 2 adds additional security to the tier 1 security. Also, the container control operation 81 permits service, maintenance and other normal operations to be carried out on the tier 1 devices without unwarranted tier 1 operations. Additionally, the container control operation 81 allows security-compromising conditions in the repository container 12 to pass security signals to the tier 1 level devices so that the tier 1 devices can be appropriately deactivated in response to the tier 2 operations.

In FIG. 22, the tier 3 security operation results from computer system 7 for each of the client system units 11 of FIG. 1. The computer system operations 72-1, . . . 72-S correspond to the computer system 7 of client system units 11-1, . . . , 11-C. Collectively, the computer system operations 72-1, . . . 72-S form an integrated computer system operation 73. The actual implementation of the operations in tier 3 involves any number of different architectures. For example, one of the computer systems operations 72-1, . . . 72-S may be designated a master and each of the others may be designated a slave. Alternatively, the various processes required in the computer system operation 73 may be distributed as the different processes on the different computers 7 in the client system units 11 of FIG. 1 in a distributed processing operation. The particular architecture selected is a function of the client system 11. Whatever the architecture, the computer system operation 73 functions to issue the requests associated with the transfer of that value to and from the SCD repositories and the requests which are necessary to control the security operations in tier 2 and tier 1. Such operations include deactivation under conditions detected in tier 3 as well as planned operations such as maintenance service of the value data system.

Typical Operation—FIG. 23

FIG. 23 shows a representative, but not exhaustive, sequence of actions in an implementation of the invention. The actions represented are for the normal servicing of SCD repositories 2 contained in a repository container 12. Normal servicing actions are performed in the tier 1 SCDR operation 70, the tier 2 repository container operation 81, and the computer system operation 71 of FIG. 22.

The main sequence actions in FIG. 23 commence at START and are connected by a heavy solid line. As the first action in a normal service sequence, the tier 3 computer system operation 73 of FIG. 22 schedules the service to be performed (block C1 in FIG. 23). Service may be scheduled in response to any of a number of normal and exceptional operating conditions, including regularly scheduled maintenance, normal operation that requires the service of end-of-life components, detected anomalous operation, and ad hoc service demands. Typically, scheduling service includes establishing a time interval within which the service is to be performed and the preparation of detailed instructions for the service technician, where the service instructions include a specification of the locations of one or more SCD repositories 2 that require service and the actions to be performed on those SCD repositories 2.

Before the time of the scheduled service, the computer system operation 73 prepares the tier 1 SCD repositories 2 for the service (block C2 of FIG. 23), if necessary. Under normal operating procedures controlled by the computer system operation 73 of FIG. 22, SCDR operation 70-1 associated with an SCD repository 2 that is scheduled for service may be in the WORKING PHASE 71-2 of FIG. 22 in which phase it typically contains incentive for theft, or the SCD operation 70 may be in the SUSPENDED PHASE 71-4 in which phase the associated SCD repository 2 typically contains no incentive for theft. Under normal operating procedures, SCD repositories may be deactivated with a SECURE_REQ, as shown in the SCDR_WORKING PHASE diagram of FIG. 9, which flows through to the SCDR_SUSPENDED PHASE 71-4. As shown in the SCDR_SUSPENDED PHASE diagram of FIG. 11, the SCD repository 2 does not respond to conditions that would be considered security threats in the SCDR_WORKING PHASE 71-2. Conditions not considered security threats in the SCDR_SUSPENDED PHASE 71-4 include conditions tested by the SYSTEM_GOOD test, the POWER_FAIL_IMMINENT test, the COMMS_OK test, and the REPOSITORY_INTRUSION test. In the alternative to the SECURE_REQ request, computer system operation 73 may issue a sequence of OTHER COMPUTER REQ requests to the SCD repository 2 while in the SCDR_WORKING PHASE 71-2. The OTHER_COMPUTER_REQ requests typically deactivate the SCD repositories 2 by removing value out of the SCD repository 2. Typically the SCR repository 2 would be sent to the SCDR_SUSPENDED PHASE 71-4 by a SUSPEND_REQ request or by flow from the SCDR_SECURING PHASE 71-3.

In FIG. 23, the main sequence of actions flows from tier 3 at block C2 to the S1 block of tier 2. S1 represents the first action of a sequence of actions in tier 2 that are performed by a service technician, as monitored by the value data system 1 to insure that security is not compromised by improper service procedures. In S1, the service technician gains access to the contents of the repository container 12 by opening the doors or other restraining device that shield the repository container 12 during normal operation. These actions may require disengaging one or more locks. Opening the doors will cause the CSU_SECURITY_STATE of the repository container 12 to be set to OPEN, as shown on the CSU process diagram of FIG. 21. Opening these doors or other restraining device cause SSU_OPEN notices to be sent to the computer system operation 73 either directly from the repository container 12, or indirectly through the action of one or more of the SCD repositories 2.

After gaining access to the interior of the repository container 12, the technician engages the bypass element 64 of FIG. 6 for the SCD repositories 2 scheduled for service in the repository container 12 (block S3 of FIG. 23). Engaging the bypass element 64 may cause notices to be sent to the computer system operation 73 either directly from the repository container 12, or indirectly through the action of one or more of the SCD repositories 2.

With the bypass activated, the service technician removes the SCD repositories 2 to be serviced (block S5 of FIG. 23). If, in violation of normal operating procedures, the service technician should engage the bypass for a SCD repository 2 or remove a SCD repository 2 when that bypassed or removed SCD repository 2 is in the SCDR_WORKING PHASE 71-2, the bypassed or removed SCD repository 2 will deactivate by the operations diagramed in SCDR_WORKING PHASE of FIG. 9.

The service technician then performs maintenance and restorative actions (block S6 of FIG. 23). Typical actions are preparing new SCD repositories 2, servicing just removed SCD repositories 2 by replacement of the security controlled devices 3 in that SCD repository 2, inserting refurbished or new SCD repositories 2 back into the repository container 12, and disengaging the bypass to return the SCD repositories 2 to operation. A restored SCD repository 2 that is returned will, if the unit is functioning properly, pass through the SCDR_STOPPED PHASE 71-1 to the SCDR_WORKING PHASE. Inserting the SCD repositories 2 and disengaging the bypass element 64 may cause notices to be sent to the computer system operation 73 either directly from the repository container 12, or indirectly through the action of one or more of the SCD repositories 2. In the SCDR_WORKING PHASE 71-2 as diagramed in the SCDR WORKING_PHASE of FIG. 9, the SCD is receptive to requests from the computer system operation functions 73 that may restore value using one or more OTHER COMPUTER REQ requests or may cause transition to the SCDR_SUSPENDED PHASE with a SUSPEND_REQ request.

The service technician ends the service by closing and locking the access doors, covers (block S8 of FIG. 23). This operation sets the CSU_SECURITY_STATE of the repository container 12 to SECURE, as shown on the CSU process diagram of FIG. 21. The acts of securing the access doors, or covers or other restraining services and covers may cause notices to be sent to the computer system operation 73 either directly from the repository container 12, or indirectly through the action of one or more of the SCD repositories 2.

In FIG. 23, the main sequence actions conclude by actions of the computer system operation 73 in tier 3 (block C6 of FIG. 23). These completing actions of computer system operation 73 complete the audit trail log of the scheduled service actions and end the service mode, returning the value data system 1 to full security status.

In support of the main sequence actions in FIG. 23, the three tiers of value data system 1 cooperate in assuring that proper procedures are followed and that an audit trail of actions is maintained.

In tier 2, container control operation 81 of FIG. 22 as diagramed in FIG. 21 react to the open or closed state of the doors, and covers or other restraining devices of the system, sending an CSU_OPEN advisory in block S2 of FIG. 23 and an CSU_SECURE advisory in block S9 of FIG. 23, and sending to SCD repositories 2 in the repository container 12 of the CSU_SECURITY_STATE of the container security unit 6 (OPEN in block S2 of FIG. 23 and SECURE in block S9 of FIG. 23), and disconnect and reconnect SCD repositories in response to engaging and disengaging of the bypass elements 64-1 (blocks S4 and S7 of FIG. 23).

In tier 1, SCD repositoriy operation 70-1 of FIG. 22 responds to request of computer system operation 73 in block R1 of FIG. 23. Requests from the computer system operation 73 accomplish deactivation of security controlled devices 3 contained in SCD repositories 2 that are scheduled for service, and the transition to the suspended state 71-4.

In block R2 of FIG. 23, SCDR operation 70-1 responds as shown in FIG. 21 to the change in CSU_SECURITY_STATE of the container control operation 81 to OPEN as caused by the opening of doors. CSU_OPEN advisories are sent to computer system operation 81. As indicated by the heavy dotted line from block C3 to block R2 in FIG. 23, if the change in CSU_SECURITY_STATE is not consistent with the service schedule and so is a violation of proper procedure, computer system operation 73 will issue requests to SCDR operation 70-1. These requests remove the incentive for theft of security controlled devices 2 that are exposed to theft because of the violation of procedure by deactivating the security controlled devices.

In block R3 of FIG. 23, SCDR operation 70-1 responds to the activation of the bypass element 61 as shown in FIG. 21 to the change in CSU_SECURITY_STATE of the container control operation 81 as shown in FIG. 21 that is caused by the opening of doors. Bypass advisories are sent to computer system operation 81. In block R3, two cases of violation of procedure can cause deactivation of security controlled devices 3: in the first case, as indicated by the heavy dotted line from block C3 to block R2 in FIG. 23, if the change in CSU_SECURITY_STATE is not consistent with the service schedule computer system operation 73 will issue value removal or SECURE_REQ requests to SCDR operation 70-1; in the second case indicated by the heavy dotted line looping from block R3 of FIG. 23 back to block R3, an SCD repository 2 in the SCDR_WORKING PHASE 71-2 will flow to the SCDR_SECURING PHASE 71-3 where the security controlled devices will lock according to FIG. 10.

In block R4 of FIG. 23, newly inserted and powered on SCD repositories 2 perform self tests in the SCDR_STOPPED PHASE 71-1 of FIG. 22, send a WORKING advisory to computer system operations 73 of FIG. 22, and proceed to the SCDR_WORKING PHASE 71-2 of FIG. 22. In the SCDR WORKING PHASE, since the SCDR repository is sensitive to requests from the computer system operations 73, security controlled devices 3 contained in the SCD repository 2 may be put into service.

In block R5 of FIG. 23, SCDR operation 70-1 responds as shown in FIG. 21 to the change in CSU_SECURITY_STATE of the container control operation 81 81 to SECURE as caused by the closing of doors. CSU_SECURE advisories are sent to computer system operation 81.

In tier 3, the computer system operation 73 receives advisories from container control operation 81 and from SCDR operation 71-2 and logs progress of the servicing, including the start and end of the service in blocks C3 and C6 respectively of FIG. 23, and the removal and restoration of SCD repositories in blocks C4 and C5 respectively of FIG. 23. Additionally, computer system operation 73 monitors the servicing. On detection of security breaches or violation of proper service procedure computer system operation 73 will remove the incentive for theft by issuing requests to the SCDR operation 70-1 by deactivating security controlled devices 3 (blocks C3 and C4 of FIG. 23).

While the invention has been particularly shown and described with reference to preferred embodiments thereof it will be understood by those skilled in the art that various changes in form and details may be made therein without departing from the spirit and scope of the invention.

What is claimed is:

1. A value data system having one or more security controlled device repositories for transferring value data in response to client requests from a client system where each security controlled device repository includes, a security controlled device enclosure containing,
one or more security controlled devices for providing value data for transfer, each of said security controlled devices including deactivating means for electronically deactivating the security controlled device,
a processor unit for connecting a data transfer request from the client system to said one or more security controlled devices and for transferring data from said one or more security controlled devices,
a repository security unit for controlling the deactivating of said one or more security controlled devices in response to security signals to control transfers of value data from said one or more security controlled devices,
said value data system including a repository container including,
said one or more repositories,
a container security unit providing said security signals as a function of conditions detected in said repository container, said container security unit including bypass means for bypassing selected ones of said one or more repositories wherein ones of said security signals from said selected ones of said repositories do not cause security controlled devices to be locked.

2. The value data system of claim 1 wherein said repository container includes detector means for detecting conditions in said repository container and responsively providing detector signals to cause said container security unit to provide said security signals.

3. The value data system of claim 2 wherein said repository container includes a restrainer operable to be opened to permit installing and de-installing repositories and said detector means includes an open detector for providing open signals as said detector signals when said restrainer is open.

4. The value data system of claim 2 wherein said detector means includes an intrusion detector for providing intrusion signals as said detector signals upon detection of an intrusion into said repository container.

5. The value data system of claim 2 wherein said detector means includes an exceptional-condition detector for providing exceptional-condition signals as said detector signals upon detection of exceptional-conditions.

6. The value data system of claim 5 wherein said exceptional-conditions include intrusion, power failure, communication loss and system not-good.

7. The value data system of claim 1 wherein said container security unit senses client control signals from said client system and responsively provides said security signals.

8. The value data system of claim 1 wherein said security signals cause said security controlled devices in said repositories to be locked to prevent transferring said value data.

9. The value data system of claim 1 wherein said container security unit links each of said one or more repositories wherein said security signals from any one of said repositories causes each of said security controlled devices in others of said repositories to be locked to prevent transferring value data.

10. The value data system of claim 1 wherein said client system provides client signals for selecting ones of said one or more repositories to be bypassed.

11. The value data system of claim 1 including a multi-tier control structure in which said one or more repositories operate in a first tier wherein security controlled devices in said one or more repositories are deactivated in response to security control signals generated in said first tier.

12. The value data system of claim 1 including a multi-tier control structure in which said one or more repositories operate in a first tier wherein security controlled devices in said one or more repositories are locked in response to security control signals generated in said first tier and in which said container security unit is in a second tier wherein security signals from said second tier are passed to said first tier to lock said repositories.

13. The value data system of claim 1 including a multi-tier control structure in which said one or more repositories operate in a first tier wherein security controlled devices in said one or more repositories are locked in response to security control signals generated in said first tier, in which said container security unit is in a second tier wherein security signals from said second tier are passed to said first tier to lock said repositories and in which said client system is in a third tier wherein client signals from said third tier are passed to said first tier to deactivate said repositories.

14. The value data system of claim 1 including a multi-tier control structure in which said one or more repositories operate in a first tier wherein security controlled devices in said one or more repositories are locked in response to security control signals generated in said first tier, in which said container security unit is in a second tier wherein security signals from said second tier are passed to said first tier to lock said repositories and in which said client system is in a third tier and wherein client signals from said third tier are passed to said first tier directly or indirectly through said second tier to deactivate said repositories.

15. The value data system of claim 1 including a multi-tier control structure in which said one or more repositories operate in a first tier wherein security controlled devices in said one or more repositories are locked in response to security control signals generated in said first tier, in which said container security unit is in a second tier wherein security signals from said second tier are passed to said first tier to lock said repositories and in which said client system is in a third tier and wherein client signals from said third tier are conditionally passed to said first tier directly or indirectly through said second tier to deactivate said repositories.

16. The value data system of claim 1 including a multi-tier security operation in which said one or more repositories operate in a first tier wherein security controlled devices in said one or more repositories are deactivated in response to security control signals, said container security unit is in a second tier and said client system is in a third tier and wherein client signals from said third tier generate service signals to designate repositories that are scheduled for service.

17. The value data system of claim 16 in which said service signals cause value to be removed from security controlled devices in said one or more repositories scheduled for service.

18. The value data system of claim 16 in which said service signals cause security controlled devices in said one or more repositories scheduled for service to be locked.

19. The value data system of claim 16 wherein security signals lock repositories that are not scheduled for service.

20. The value data system of claim 16 wherein said security controlled devices are value stores and said security signals lock repositories if said repositories contain value data.

21. The value data system of claim 16 wherein security signals lock repositories that are not scheduled for service if security controlled devices in said repositories contain value data.

22. The value data system of claim 16 wherein security signals include an exceptional-condition signal from repositories that are not scheduled for service and wherein said exceptional-condition signal locks repositories that are not scheduled for service.

23. The value data system of claim 16 wherein said security signals that lock repositories that are not scheduled for service are generated in said first tier or in said second tier.

24. The value data system of claim 16 wherein said security signals that lock repositories that are not scheduled for service are generated in said second tier by detector means.

25. The value data system of claim 24 wherein said detector means includes an exceptional-condition detector for providing exceptional-condition signals as said detector signals upon detection of exceptional-conditions.

26. The value data system of claim 25 wherein said exceptional-conditions include intrusion, power failure, communication loss and system not-good.

27. The value data system of claim 1 wherein,
said repository container includes a restrainer operable to be opened to permit installing and de-installing repositories,
detector means for detecting conditions in said repository container and responsively providing detector signals to cause said container security unit to provide said security signals, said detector means including an open detector for providing an open signal as one of said detector signals,
said value data system includes a multi-tier security operation in which said one or more repositories operate in a first tier wherein security controlled devices in said one or more repositories are deactivateed in response to security control signals, said container security unit is in a second tier and said client system is in a third tier and wherein client signals from said third tier generate service signals to designate repositories that are scheduled for service and wherein security signals generated in response to said open signal for a repository scheduled for service is prevented from deactivating said repositories that are not scheduled for service.

28. The value data system of claim 27 wherein said detector means includes an intrusion detector for providing an intrusion signal as one of said detector signals upon detection of an intrusion into said repository container and wherein security signals resulting from said intrusion signal function to lock repositories that are not scheduled for service.

29. The value data system of claim 1 wherein, in one or more of said repositories, said repository security unit operates with a locking sequence that includes obtaining one or more locking keys from said processor unit and applying said one or more locking keys to lock said one or more security controlled devices.

30. The value data system of claim 29 wherein, in one or more of said repositories, said repository security unit operates with a locking sequence that includes discarding said one or more locking keys after said one or more security controlled devices is locked so that said one or more locking keys does not remain in said security controlled device enclosure.

31. The value data system of claim 1 wherein, in one or more of said repositories, said repository security unit operates with a locking sequence that includes obtaining one or more locking keys from said client system and applying said one or more locking keys to lock said one or more security controlled devices.

32. The value data system of claim 1 wherein, in one or more of said repositories, said repository security unit operates with a locking sequence that includes said processor unit randomly generating one or more locking keys, applying said one or more locking keys to lock said one or more security controlled devices and discarding said one or more locking keys after said one or more security controlled devices is locked so that said one or more locking keys does not remain in said security controlled device enclosure.

33. The value data system of claim 1 wherein, in one or more of said repositories, each of said security controlled devices includes means for automatically locking in response to security signals.

34. The value data system of claim 1 wherein, in one or more of said repositories, each of said one or more security controlled devices includes unlocking means for unlocking said one or more security controlled devices to permit transfers of value data from said one or more security controlled devices.

35. The value data system of claim 34 wherein, in one or more of said repositories, said unlocking means respond to one or more unlocking sequences for unlocking said one or more security controlled devices.

36. The value data system of claim 35 wherein, in one or more of said repositories, said unlocking sequences include a backdoor unlocking sequence.

37. The value data system of claim 1 wherein, in one or more of said repositories, said repository security unit operates with a locking sequence that includes obtaining one or more locking keys from said processor unit, applying said one or more locking keys to lock said one or more security controlled devices and discarding said one or more locking keys after said one or more security controlled devices is locked so that said one or more locking keys does not remain in said security controlled device enclosure and wherein each of said one or more security controlled devices includes unlocking means responsive to a backdoor sequence for unlocking said one or more security controlled devices to permit transfers of value data from said one or more security controlled devices.

38. The value data system of claim 1 wherein, in one or more of said repositories, said repository security unit operates with a locking sequence that includes obtaining one or more locking keys randomly generated by said processor unit, applying said one or more locking keys to lock said one or more security controlled devices and discarding said one or more locking keys after said one or more security controlled devices is locked so that said one or more locking keys does not remain in said security controlled device enclosure and wherein each of said one or more security controlled devices includes unlocking means responsive to a backdoor sequence for unlocking said one or more security controlled devices to permit transfers of value data from said one or more security controlled devices.

39. The value data system of claim 1 wherein, in one or more of said repositories, said security controlled devices are mounted in said security controlled device enclosure under restraint of a restraining device movable to permit removal of the security controlled devices.

40. The value data system of claim 39 wherein, in one or more of said repositories, said restraining device includes a restraining lock having a delay time for generating a lock signal for initiating said locking sequence when said restraining device is moved so as to enable said security controlled devices to be locked before said security controlled devices are de-installed.

41. The value data system of claim 40 wherein, in one or more of said repositories, said restraining device is a cover.

42. The value data system of claim 1 wherein, in one or more of said repositories, said repository security unit detects tampering with said value data system as a security breach.

43. The value data system of claim 1 wherein, in one or more of said repositories, said repository security unit detects power loss as a security breach.

44. The value data system of claim 1 wherein, in one or more of said repositories, said repository security unit operates with a locking sequence that is generated in response to a command from said client system.

45. The value data system of claim 44 wherein, in one or more of said repositories, said locking sequence includes obtaining one or more locking keys from said processor unit and applying said one or more locking keys to lock said one or more value stores.

46. The value data system of claim 1 wherein, in one or more of said repositories, said security controlled devices store electronic funds.

47. The value data system of claim 46 wherein, in one or more of said repositories, said electronic funds are wire transfers.

48. The value data system of claim 46 wherein, in one or more of said repositories, said electronic funds are electronic cash.

49. The value data system of claim 46 wherein, in one or more of said repositories, said electronic funds are certificated value electronic cash.

50. The value data system of claim 46 wherein, in one or more of said repositories, said electronic funds are net value electronic cash.

51. The value data system of claim 1 wherein said security controlled devices are value stores.

52. The value data system of claim 1 wherein, in one or more of said repositories, said repository security unit operates with a locking sequence, said security controlled devices are value stores and said value data is electronic funds.

53. The value data system of claim 52 wherein, in one or more of said repositories, said locking sequence includes discarding said one or more locking keys after said one or more value stores is locked so that said one or more locking keys does not remain in said security controlled device enclosure.

54. The value data system of claim 52 wherein, in one or more of said repositories, said locking sequence includes obtaining one or more locking keys from said client system and applying said one or more locking keys to lock said one or more value stores.

55. The value data system of claim 52 wherein, in one or more of said repositories, said locking sequence includes said processor unit randomly generating said one or more locking keys and discarding said one or more locking keys after said one or more value stores is locked so that said one or more locking keys does not remain in said security controlled device enclosure.

56. The value data system of claim 52 wherein, in one or more of said repositories, each of said value stores includes means for automatically locking in response to security signals.

57. The value data system of claim 52 wherein, in one or more of said repositories, each of said one or more value stores includes unlocking means for unlocking said one or more value stores to permit transfers of value data from said one or more value stores.

58. The value data system of claim 57 wherein, in one or more of said repositories, said unlocking means respond to one or more unlocking sequences for unlocking said one or more value stores.

59. The value data system of claim 58 wherein, in one or more of said repositories, said unlocking sequences includes a backdoor unlocking sequence.

60. The value data system of claim 52 wherein, in one or more of said repositories, said locking sequence includes obtaining one or more locking keys from said processor unit, applying said one or more locking keys to lock said one or more value stores and discarding said one or more locking keys after said one or more value stores is locked so that said one or more locking keys does not remain in said security controlled device enclosure and wherein each of said one or more value stores includes unlocking means responsive to a backdoor sequence for unlocking said one or more value stores to permit transfers of value data from said one or more value stores.

61. The value data system of claim 52 wherein, in one or more of said repositories, said locking sequence includes obtaining one or more locking keys randomly generated by said processor unit, applying said one or more locking keys to lock said one or more value stores and discarding said one or more locking keys after said one or more value stores is locked so that said one or more locking keys does not remain in said security controlled device enclosure and wherein each of said one or more value stores includes unlocking means responsive to a backdoor sequence for unlocking said one or more value stores to permit transfers of value data from said one or more value stores.

62. The value data system of claim 52 wherein, in one or more of said repositories, said value stores are removably mounted in said security controlled device enclosure under a value data system cover that can be opened.

63. The value data system of claim 62 wherein, in one or more of said repositories, said value data system cover includes a cover lock means having a delay time for generating a lock signal for initiating said locking sequence when said value data system cover is opened so as to enable said value stores to be locked before said value data system cover is opened.

64. The value data system of claim 52 wherein, in one or more of said repositories, said repository security unit detects tampering with said value data system as a security breach.

65. The value data system of claim 52 wherein, in one or more of said repositories, said repository security unit detects power loss as a security breach.

66. The value data system of claim 52 wherein, in one or more of said repositories, said locking sequence is generated in response to a command from said client system.

67. The value data system of claim 1 wherein said container security unit includes bypass means for bypassing selected ones of said one or more repositories wherein ordinary ones of said security signals from said selected ones of said repositories do not cause said repositories to be deactivated.

68. The value data system of claim 1 wherein said bypass means includes one or more bypass elements corresponding to said one or more repositories, respectively, said bypass elements for bypassing selected ones of said corresponding one or more repositories wherein ordinary ones of said security signals from said selected ones of said repositories do not cause said repositories to be deactivated.

69. The value data system of claim 1 wherein said client system specifies one or more repositories including activated repositories and including deactivated repositories, said bypass means includes one or more bypass elements corresponding to said deactivated repositories, said bypass elements enabled for bypassing said deactivated repositories for ordinary ones of said security signals.

70. The value data system of claim 69 wherein said bypass elements are enabled by said client system.

71. The value data system of claim 70 wherein said bypass elements are enabled for a duration specified by said client system.

72. In a value data system having a repository container including a container security unit and one or more security controlled device repositories for transferring value data in response to client requests from a client system, the method where, each repository has an enclosure and operates with the steps of:
providing value data from one or more security controlled devices, each of said security controlled devices including deactivating means for electronically deactivating the security controlled device,
connecting a data transfer request from the client system through a processor unit to said one or more security controlled devices and transferring value data from said one or more security controlled devices,
sensing a security breach in a repository security unit and responsively initiating a deactivating sequence for deactivating said one or more security controlled devices in response to security signals to inhibit transfers of value data from said one or more security controlled devices,
said container security unit operates with the steps of:
providing said security signals as a function of sensed signals in said repository container,
bypassing selected ones of said one or more repositories wherein ones of said security signals from said selected ones of said repositories do not cause security controlled devices to be locked.

73. The method in the value data system of claim 72 including detecting conditions in said repository container and responsively providing detector signals to control said security signals.

74. The method in the value data system of claim 73 wherein said repository container includes a restrainer operable to be opened to permit installing and de-installing repositories and providing open signals as said detector signals when said restrainer is open.

75. The method in the value data system of claim 73 including providing intrusion signals upon detection of an intrusion into said repository container.

76. The method in the value data system of claim 73 including providing exceptional-condition signals as said detector signals upon detection of exceptional-conditions.

77. The method in the value data system of claim 76 wherein said exceptional-conditions include intrusion, power failure, communication loss and system not-good.

78. The method in the value data system of claim 72 wherein client control signals provide said security signals.

79. The method in the value data system of claim 72 wherein said security signals cause each of said security controlled devices in each of said repositories to be locked to prevent transferring said value data.

80. The method in the value data system of claim 72 linking each of said one or more repositories wherein said security signals from any one of said repositories causes each of said security controlled devices in others of said repositories to be locked to prevent transferring value data.

81. The method in the value data system of claim 72 wherein client signals select ones of said one or more repositories to be bypassed.

82. The method in the value data system of claim 72 wherein one or more repositories operate in a first tier wherein security controlled devices in said one or more repositories are locked in response to security control signals generated in said first tier.

83. The method in the value data system of claim 72 where said one or more repositories operate in a first tier wherein security controlled devices in said one or more repositories are locked in response to security control signals generated in said first tier and in which said container security unit is in a second tier wherein security signals from said second tier are passed to said first tier to lock said repositories.

84. The method in the value data system of claim 72 where said one or more repositories operate in a first tier wherein security controlled devices in said one or more repositories are locked in response to security control signals generated in said first tier, in which said container security unit is in a second tier wherein security signals from said second tier are passed to said first tier to lock said repositories and in which said client system is in a third tier wherein client signals from said third tier are passed to said first tier to lock said repositories.

85. The method in the value data system of claim 72 where said one or more repositories operate in a first tier wherein security controlled devices in said one or more repositories are locked in response to security control signals generated in said first tier, in which said container security unit is in a second tier wherein security signals from said second tier are passed to said first tier to lock said repositories and in which said client system is in a third tier and wherein client signals from said third tier are passed to said first tier directly or indirectly through said second tier to deactivate said repositories.

86. The method in the value data system of claim 72 where said one or more repositories operate in a first tier wherein security controlled devices in said one or more repositories are locked in response to security control signals generated in said first tier, in which said container security unit is in a second tier wherein security signals from said second tier are passed to said first tier to deactivate said repositories and in which said client system is in a third tier and wherein client signals from said third tier are conditionally passed to said first tier directly or indirectly through said second tier to deactivate said repositories.

87. The method in the value data system of claim 72 where said one or more repositories operate in a first tier wherein security controlled devices in said one or more repositories are deactivated in response to security control signals, said container security unit is in a second tier and said client system is in a third tier and wherein client signals from said third tier generate service signals to designate repositories that are scheduled for service.

88. The method in the value data system of claim 87 in which said service signals cause value data to be removed from security controlled devices in said one or more repositories scheduled for service.

89. The method in the value data system of claim 87 in which said service signals cause security controlled devices in said one or more repositories scheduled for service to be locked.

90. The method in the value data system of claim 87 wherein security signals in response to exceptional-conditions deactivate repositories that are not scheduled for service.

91. The method in the value data system of claim 87 wherein security signals lock repositories that are not scheduled for service if security controlled devices in said repositories contain value data.

92. The method in the value data system of claim 87 wherein security signals include an exceptional-condition signal from repositories that are not scheduled for service and wherein said exceptional-condition signal deactivates repositories that are not scheduled for service.

93. The method in the value data system of claim 87 wherein said security signals that deactivate repositories that are not scheduled for service are generated in said first tier or in said second tier.

94. The method in the value data system of claim 87 wherein said security signals that deactivate repositories that are not scheduled for service are generated in said second tier.

95. The method in the value data system of claim 94 wherein exceptional-condition signals are provided as said detector signals upon detection of exceptional-conditions.

96. The method in the value data system of claim 95 wherein said exceptional-conditions include intrusion, power failure, communication loss and system not-good.

97. A security controlled device repository for transferring value data in response to client requests from a client system comprising,
   a repository enclosure containing,
      one or more security controlled devices for providing value data for transfer, each of said security controlled devices including deactivating means for electronically deactivating the security controlled device,
      a processor unit for connecting a data transfer request from the client system to said one or more security controlled devices and for transferring value data from said one or more security controlled devices,
      a repository security unit for controlling the deactivating of said one or more security controlled devices, when value data is present in said one or more security controlled devices, in response to security signals to control transfers of value data from said one or more security controlled devices.

* * * * *